United States Patent
Zhu et al.

(10) Patent No.: US 11,425,571 B2
(45) Date of Patent: Aug. 23, 2022

(54) DEVICE CONFIGURATION METHOD, APPARATUS AND SYSTEM

(71) Applicant: Alibaba Group Holding Limited, Grand Cayman (KY)

(72) Inventors: Bijun Zhu, Zhejiang (CN); Haijun Jia, Zhejiang (CN); Jiankang Sun, Zhejiang (CN)

(73) Assignee: Alibaba Group Holding Limited, George Town (KY)

( * ) Notice: Subject to any disclaimer, the term of this patent is extended or adjusted under 35 U.S.C. 154(b) by 31 days.

(21) Appl. No.: 16/516,180

(22) Filed: Jul. 18, 2019

(65) Prior Publication Data
US 2019/0342753 A1 Nov. 7, 2019

Related U.S. Application Data

(63) Continuation of application No. PCT/CN2018/071525, filed on Jan. 5, 2018.

(30) Foreign Application Priority Data

Jan. 19, 2017 (CN) .......................... 201710039829.6

(51) Int. Cl.
*H04W 12/47* (2021.01)
*H04W 12/48* (2021.01)
(Continued)

(52) U.S. Cl.
CPC ......... *H04W 12/47* (2021.01); *H04W 12/068* (2021.01); *H04W 12/48* (2021.01); *H04W 12/75* (2021.01)

(58) Field of Classification Search
CPC ....... H04W 12/00407; H04W 12/0608; H04W 12/00409; H04W 12/00518; H04W 4/80;
(Continued)

(56) References Cited

U.S. PATENT DOCUMENTS 8,037,538 B2 * 10/2011 Baba ...................... H04L 63/08
726/27
8,074,262 B2 12/2011 Scarlata
(Continued)

FOREIGN PATENT DOCUMENTS

CN 101309143 A 11/2008
CN 101339677 A 1/2009
(Continued)

OTHER PUBLICATIONS

Translation of CN Office Action from Corresponding CN Application No. 201710039829.6 dated Apr. 23, 2020, a counterpart foreign application for U.S. Appl. No. 16/516,180, 16 pages.
(Continued)

*Primary Examiner* — Oleg Korsak
(74) *Attorney, Agent, or Firm* — Lee & Hayes, P.C.

(57) ABSTRACT

A system including user device of a preset administrative user, a server, and a smart device. The user device sends a binding request for the smart device to the server, the binding request being used for instructing the server to bind the smart device. The server records an administrative permission for the administrative user to the smart device in the process of binding. When a near-field communication signal from any user is received, the smart device identifies the identity of the user; and when the user is determined as the administrative user, the smart device establishes a near-field communication connection with an electronic device of the user to allow the user to configure the smart device. With the technical solution of the present disclosure, a device may be configured based on software, and accordingly, security dangers of a physical key are eliminated while configuration operations are simplified.

20 Claims, 14 Drawing Sheets

(51) Int. Cl.
*H04W 12/06* (2021.01)
*H04W 12/75* (2021.01)

(58) Field of Classification Search
CPC ... H04W 12/47; H04W 12/068; H04W 12/75; H04W 12/48; H04L 63/08; H04L 67/303; H04L 67/306; H04L 63/10
See application file for complete search history.

(56) References Cited

U.S. PATENT DOCUMENTS

| | | | | |
|---|---|---|---|---|
| 8,245,048 | B2* | 8/2012 | Chai | H04L 63/08 |
| | | | | 713/181 |
| 8,838,982 | B2* | 9/2014 | Carlson | H04L 9/3247 |
| | | | | 713/176 |
| 9,450,757 | B2* | 9/2016 | Modarresi | H04L 9/3242 |
| 9,473,941 | B1* | 10/2016 | Palin | H04W 4/80 |
| 9,641,335 | B2* | 5/2017 | Bruce | H04L 63/083 |
| 9,736,131 | B2* | 8/2017 | Khalid | H04L 63/0807 |
| 9,754,443 | B2 | 9/2017 | Hedrick et al. | |
| 9,917,619 | B2* | 3/2018 | Turner | H04W 76/11 |
| 9,935,951 | B2* | 4/2018 | Spilman | H04L 63/0853 |
| 9,954,691 | B2 | 4/2018 | Ren et al. | |
| 10,104,599 | B2* | 10/2018 | Hou | H04W 8/18 |
| 10,212,107 | B2 | 2/2019 | Chen et al. | |
| 10,238,001 | B2* | 3/2019 | Agrawal | E04H 5/00 |
| 10,321,317 | B1* | 6/2019 | Yau | G06F 8/65 |
| 10,547,609 | B2 | 1/2020 | Liu et al. | |
| 10,567,408 | B2* | 2/2020 | Narayanan | H04L 63/083 |
| 10,601,796 | B2* | 3/2020 | Adams | H04L 63/0823 |
| 10,764,734 | B2* | 9/2020 | Osa | H04W 12/06 |
| 2008/0095361 | A1* | 4/2008 | Wifvesson | H04L 9/0841 |
| | | | | 380/44 |
| 2013/0214902 | A1* | 8/2013 | Pineau | H04L 63/101 |
| | | | | 340/5.61 |
| 2014/0237627 | A1* | 8/2014 | Mylavarapu | H04L 63/0428 |
| | | | | 726/30 |
| 2014/0298037 | A1* | 10/2014 | Xiao | H04W 4/70 |
| | | | | 713/181 |
| 2015/0081837 | A1* | 3/2015 | Bernier | H04W 4/50 |
| | | | | 709/217 |
| 2016/0037346 | A1* | 2/2016 | Boettcher | H04L 63/107 |
| | | | | 455/411 |
| 2016/0103970 | A1 | 4/2016 | Liu et al. | |
| 2016/0283691 | A1* | 9/2016 | Ali | G06F 19/3456 |
| 2016/0364553 | A1* | 12/2016 | Smith | H04L 63/0435 |
| 2017/0019265 | A1 | 1/2017 | Hou et al. | |
| 2017/0192723 | A1* | 7/2017 | Ichikawa | H04W 4/80 |
| 2018/0091538 | A1* | 3/2018 | Narayanan | H04W 12/068 |
| 2018/0184266 | A1* | 6/2018 | Doyijode | H04W 4/80 |
| 2018/0343123 | A1 | 11/2018 | Liu et al. | |
| 2019/0372799 | A1 | 12/2019 | Zhang | |
| 2020/0285726 | A1* | 9/2020 | Kalous | G07C 9/00182 |

FOREIGN PATENT DOCUMENTS

| | | |
|---|---|---|
| CN | 101551892 A | 10/2009 |
| CN | WO2013009385 A2 | 1/2013 |
| CN | 103401868 A | 11/2013 |
| CN | 103916366 A | 7/2014 |
| CN | 103971435 A | 8/2014 |
| CN | 104282050 A | 1/2015 |
| CN | 105227433 A | 1/2016 |
| CN | 106203950 A | 12/2016 |
| CN | 106339632 A | 1/2017 |

OTHER PUBLICATIONS

Translation of International Search Report for corresponding PCT Application PCT/CN2018/071525, dated Jul. 26, 2018, a counterpart foreign application for U.S. Appl. No. 16/516,180, 2 pages.
Translation of Written Oppinion for corresponding PCT Application PCT/CN2018/071525, dated Jul. 19, 2018, a counterpart foreign application for U.S. Appl. No. 16/516,180, 3 pages.
Translation of CN Search Report from Corresponding CN Application No. 201710039829.6 dated Apr. 17, 2020, a counterpart foreign application for U.S. Appl. No. 16/516,180, 2 pages.

* cited by examiner

DEVICE CONFIGURATION METHOD, APPARATUS AND SYSTEM

CROSS REFERENCE TO RELATED PATENT APPLICATIONS

This application claims priority to and is a continuation of PCT Patent Application No. PCT/CN2018/071525, filed on 5 Jan. 2018 and entitled "DEVICE CONFIGURATION METHOD, APPARATUS AND SYSTEM," which claims priority to Chinese Patent Application No. 201710039829.6, filed on 19 Jan. 2017 and entitled "DEVICE CONFIGURATION METHOD, APPARATUS AND SYSTEM," which are incorporated herein by reference in their entirety.

TECHNICAL FIELD

The present disclosure relates to the field of smart device technology, and, more particularly, to device configuration methods, device configuration apparatuses, and device configuration systems.

BACKGROUND

Smart devices are applied more and more frequently in conventional techniques. For example, in an enterprise scenario, a smart entrance guard, a smart attendance machine, a smart conference terminal and so on are widely used to improve the work efficiency. By taking the smart attendance machine as an example, attendance data of enterprise members within the enterprise is involved and financial management, personnel control and so on need to be performed according to the attendance data. Thus, only an administrative user within the enterprise has an administrative permission of the smart attendance machine, and may configure a wireless network used by the smart attendance machine, a bound enterprise or department, attendance rules and so on.

However, as the smart attendance machine in the conventional techniques is provided with a physical key such as "RESET," the smart attendance machine will be reset no matter who triggers the physical key, thereby resulting in extremely high hidden security dangers.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In view of the foregoing, a device configuration method, a device configuration apparatus, and a device configuration system are provided in the present disclosure, which may configure a device based on software, thus eliminating hidden security dangers of a physical key while simplifying configuration operations.

To achieve the foregoing objective, the following technical solutions are provided in the present disclosure.

According to a first aspect of the present disclosure, a device configuration system is provided, including: a user device of a preset administrative user, a server, and a smart device, wherein:

the user device is configured to send a binding request for the smart device to the server, the binding request being used for instructing the server to bind the smart device;

the server is configured to record an administrative permission for the administrative user to the smart device in the process of binding; and the smart device is configured to, when a near-field communication signal from any user is received, identify the identity of the user; and when the user is determined as the administrative user, establish a near-field communication connection with an electronic device of the user to allow the user to configure the smart device.

According to a second aspect of the present disclosure, a device configuration method is provided, including:

sending, by a user device, a near-field communication signal including identity information of a logged-in user to a smart device to instruct the smart device to identify the identity of the logged-in user; and determining, by the user device, according to a response of the smart device to the near-field communication signal, that the smart device determines the logged-in user as an administrative user corresponding to the smart device, and establishing a near-field communication connection with the smart device to configure the smart device.

According to a third aspect of the present disclosure, a device configuration method is provided, including:

acquiring, by a server, identity authentication information of an administrative user corresponding to a preset smart device when a configuration request sent by a preset user for the smart device is received; and returning, by the server, the identity authentication information to the preset user such that the preset user sends a near-field communication signal including the identity authentication information to the smart device, wherein the near-field communication signal is used for instructing the smart device to determine according to the identity authentication information that the preset user has an administrative permission, and establish a near-field communication connection with a sender device of the near-field communication signal to allow the sender device to configure the smart device.

According to a fourth aspect of the present disclosure, a device configuration method is provided, including:

acquiring, by a smart device, identity information included in a near-field communication signal sent by any use when the near-field communication signal is received;

identifying, by the smart device, the identity of the user according to the identity information; and when the user is determined as an administrative user corresponding to the smart device, establishing, by the smart device, a near-field communication connection with an electronic device used by the user to allow the electronic device to configure the smart device.

According to a fifth aspect of the present disclosure, a device configuration apparatus is provided, including:

a sending unit configured to make a user device send a near-field communication signal including identity information of a logged-in user to a smart device to instruct the smart device to identify the identity of the logged-in user; and an identifying unit configured to make the user device determine, according to a response of the smart device to the near-field communication signal, that the smart device determines the logged-in user as an administrative user corresponding to the smart device, and establish a near-field communication connection with the smart device to configure the smart device.

According to a sixth aspect of the present disclosure, a device configuration apparatus is provided, including:

an acquisition unit configured to make a server acquire identity authentication information of an administrative user corresponding to a preset smart device when a configuration request sent by a preset user for the smart device is received; and a returning unit configured to make the server return the identity authentication information to the preset user such that the preset user sends a near-field communication signal including the identity authentication information to the smart device, wherein the near-field communication signal is used for instructing the smart device to determine according to the identity authentication information that the preset user has an administrative permission, and establish a near-field communication connection with a sender device of the near-field communication signal to allow the sender device to configure the smart device.

According to a seventh aspect of the present disclosure, a device configuration apparatus is provided, including:

an acquisition unit configured to make a smart device acquire identity information included in a near-field communication signal sent by any user when the near-field communication signal is received;

an identifying unit configured to make the smart device identify the identity of the user according to the identity information; and an establishing unit configured to, when the user is determined as an administrative user corresponding to the smart device, make the smart device establish a near-field communication connection with an electronic device used by the user to allow the electronic device to configure the smart device.

As shown from the foregoing technical solutions, in the present disclosure, a smart device identifies the identity of a user who controls it, so that only a user having an administrative permission is allowed to establish a near-field communication connection between a used electronic device and the smart device and perform a configuration operation, thus avoiding security dangers when an irrelevant person triggers a related physical key in a hardware mode and enhancing the security of the configuration operation.

BRIEF DESCRIPTION OF THE DRAWINGS

In order to illustrate the technical solutions in the example embodiments of the present disclosure more clearly, the following briefly describes the accompanying drawings which aid in describing the example embodiments. Apparently, the accompanying drawings in the following description merely show some of the example embodiments of the present disclosure, and persons of ordinary skill in the art may derive other drawings from these accompanying drawings without creative efforts.

DETAILED DESCRIPTION

Smart devices are applied more and more frequently in conventional techniques. For example, in an enterprise scenario, a smart entrance guard, a smart attendance machine, a smart conference terminal and so on are being widely used to improve the work efficiency. By taking the smart attendance machine as an example, attendance data of enterprise members within the enterprise is involved and financial management, personnel control and so on need to be performed according to the attendance data. Thus, only an administrative user within the enterprise has an administrative permission to the smart attendance machine, and may set a wireless network used by the smart attendance machine, a bound enterprise or department, attendance rules and so on.

In general, the administrative user needs to be authenticated no matter whether the administrative user directly makes editing on the smart attendance machine or the electronic device administrative user edits the smart attendance machine through a client terminal on an electronic device when the electronic device used by the administrative user and the smart attendance machine run the same client terminal of a preset communication application. An editing operation may be performed only when the administrative user is confirmed to have an administrative permission to the smart attendance machine.

Figure 1:
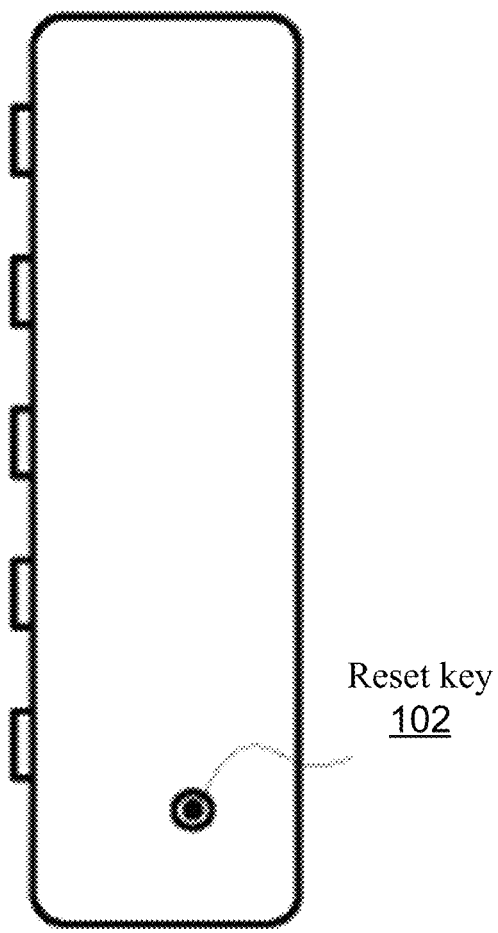
FIG. 1 is a schematic structural diagram of a smart attendance machine provided with a configuration key in the conventional techniques.

However, as the smart attendance machine is provided with physical keys such as RESET (located on a lateral side of the smart attendance machine in FIG. 1) as shown in FIG. 1, any person may reset the smart attendance machine by triggering the RESET key 102. Moreover, it is difficult to determine whether the triggering action is intentional or by mistake, so that the smart attendance machine has high hidden security dangers and the normal operation of the smart attendance machine cannot be ensured.

Therefore, a new device configuration solution is provided in the present disclosure to solve the foregoing technical problems in the conventional techniques. The following example embodiments are provided to further describe the present disclosure.

Figure 2:
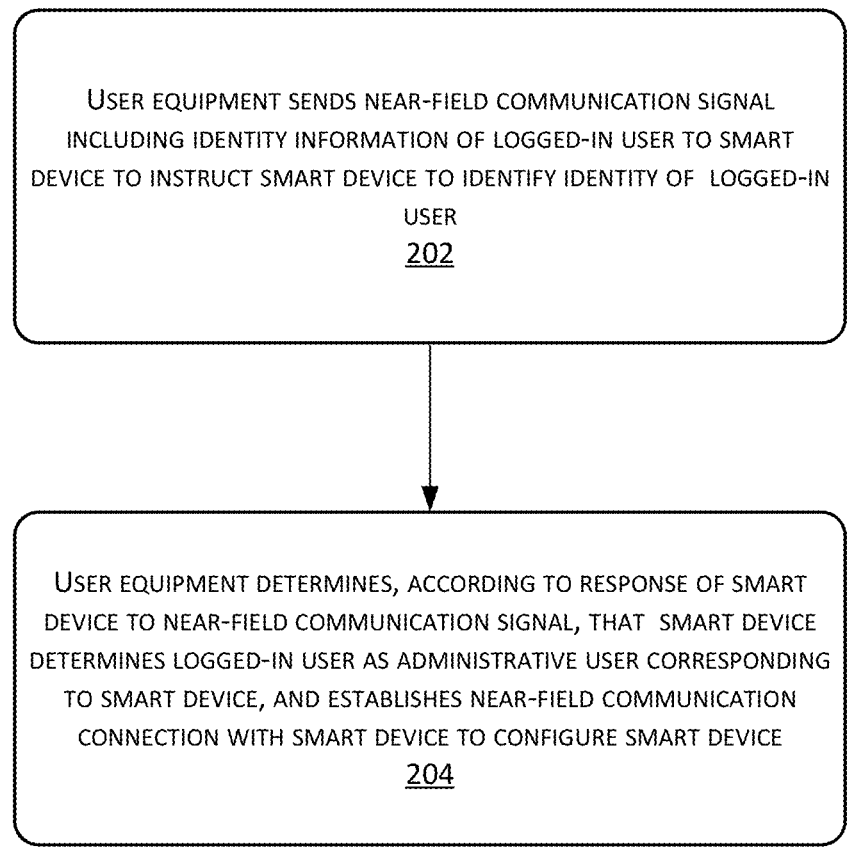
FIG. 2 is a flowchart of a device configuration method based on a user side according to an example embodiment of the present disclosure.

FIG. 2 is a flowchart of a device configuration method based on a user side according to an example embodiment of the present disclosure. As shown in FIG. 2, the method is applied to user device (i.e., an electronic device used by a preset user), and may include the following steps:

In step 202, user device sends a near-field communication signal including identity information of a logged-in user to a smart device to instruct the smart device to identify the identity of the logged-in user.

In this example embodiment, client terminals of a mobile team office platform may be run on the user device and the smart device respectively. For example, a client terminal 1 is run on the user device, and a client terminal 2 is run on the smart device. A registered account of the preset user is logged on to the client terminal 1, so that the user device or the client terminal 1 run on the user device is configured to uniquely correspond to the preset user. Similarly, the smart device or the client terminal 2 run on the smart device is also unique and configured to uniquely determine the smart device that is distinguished from other smart devices. Correspondingly, a server terminal of the mobile team office platform may be run on a server. Then, data interaction among the user device, the smart device, and the server may be implemented based on the client terminal 1, the client terminal 2, the server terminal and so on of the mobile team office platform.

In fact, a mobile enterprise office platform not only may implement a communication function but also may serve as an integrated function platform of many other functions, for example, handling of examination and approval events (such as leave request, office supplies application, and finance examination and approval events), attendance events, task events, log events, and other events internal to the enterprise, and handling of events external to the enterprise such as ordering meals and purchasing. This is not limited in the present disclosure.

For example, the mobile enterprise office platform may be carried in instant messaging applications in the conventional techniques, e.g., Enterprise Instant Messaging (EIM) applications such as Skype For Business®, Microsoft Teams®, Yammer®, Workplace®, Slack®, Enterprise WeChat®, Fxiaoke®, Enterprise Fetion®, and Enterprise Yixin®. However, the instant messaging function is only one of the communication functions supported by the mobile enterprise office platform. The enterprise office platform may further implement more other functions such as those described above, which will not be elaborated here.

In this example embodiment, by taking user device as an example, the user device is provided with a client terminal application (APP) of a mobile enterprise office platform, a registered account of a preset user at the mobile enterprise office platform is logged on, and the user device may be configured as a client terminal 1 of the mobile enterprise office platform corresponding to the preset user. The user device may be a mobile device such as a mobile phone or a tablet, or the user device may be a non-mobile user device such as a PC host, which is not limited in the present disclosure. However, when an online "client terminal" such as HTML5 technology is used, the foregoing client terminal 1 may be run on the user device without installing a corresponding application on the user device.

In step 204, the user device determines, according to a response of the smart device to the near-field communication signal, that the smart device determines the logged-in user as an administrative user corresponding to the smart device, and establishes a near-field communication connection with the smart device to configure the smart device.

In this example embodiment, the smart device may be applied to any scenario, which is not limited in the present disclosure. For example, in a scenario of a team (such as an enterprise, a school, a government agency, or a public security department), the smart device may be bound to a preset team. Therefore, the foregoing configuration request may include identity information of a local user (i.e., the foregoing preset user), for instructing the server to return identity information corresponding to the smart device when the identity information matches an administrative user of the preset team (i.e., a user in the preset team who has an administrative permission), and for a non-administrative user, the identity information may not be returned, thus implementing permission management on the configuration operation.

In this example embodiment, the user device may send a configuration request for the smart device to a server, and the configuration request is used for instructing the server to return a standard digital digest corresponding to the smart device. Then, the user device receives the standard digital digest returned by the server as the identity information of the logged-in user, wherein the standard digital digest is related to a random code previously generated and uploaded by the smart device, and the random code is further recorded as a local random code on the smart device. Then, the user device adds the standard digital digest to the near-field communication signal as the identity information, for instructing the smart device to generate a local digital digest related to the recorded local random code. When the standard digital digest matches the local digital digest, a near-field communication connection with the sender device of the near-field communication signal is established in response to the near-field communication signal, thus allowing the sender device to configure the smart device. By generating a random code on the smart device, the standard digital digest correspondingly generated may uniquely correspond to the smart device, and high security and anti-cheating performances may be achieved because of its randomness.

In this example embodiment, the smart device may generate a random code and upload it to the server in the process of initial activation and binding. However, the smart device may also generate and upload the random code at any other moment. This is not limited in the present disclosure. By use of a random-code-based standard digital digest, the standard digital digest has "randomness", may uniquely correspond to the smart device, and may also avoid being guessed by "exhaustion", thus contributive to further improve the security of the configuration operation.

In this example embodiment, an algorithm used when the server generates the standard digital digest according to the random code is identical to that used when the smart device generates a local digital digest according to a local random code, so that the standard digital digest may be ensured to be the same as the local digital digest when the random code corresponding to the standard digital digest is the same as the local random code. As a result, the smart device may identify the identity of the local user accurately, ensuring that only the administrative user may smoothly complete the configuration operation on the smart device.

In this example embodiment, the smart device may previously acquire a standard digital digest and store it locally, and the smart device may be configured at any subsequent moment according to the locally stored standard digital digest. Alternatively, the number of times the smart device uses the standard digital digest locally may be limited, so that the user device has to delete the locally stored standard digital digest and has to reacquire the standard digital digest from the server subsequently when the number of times the smart device sends a near-field communication signal to the smart device according to the locally stored standard digital digest reaches the number of times the standard digital digest is used locally. Alternatively, in order to further improve the security, it may be restricted that the smart device is not allowed to store the standard digital digest and has to acquire the standard digital digest from the server each time.

In this example embodiment, when the standard digital digest matches the local digital digest, the smart device may establish, based on the received near-field communication signal, a near-field communication connection with the user device that sends the near-field communication signal, so that a present user may configure the smart device based on the near-field communication connection when the preset user operates on the user device. When the near-field communication connection is based on the Bluetooth Low Energy (BLE) technology, such as based on the iBeacon protocol, the foregoing near-field communication signal may be an advertising message. However, the type of the near-field communication technology is not limited in the present disclosure, for example, other types of near-field communication technologies such as Near Field Communication (NFC) may also be used.

Figure 3:
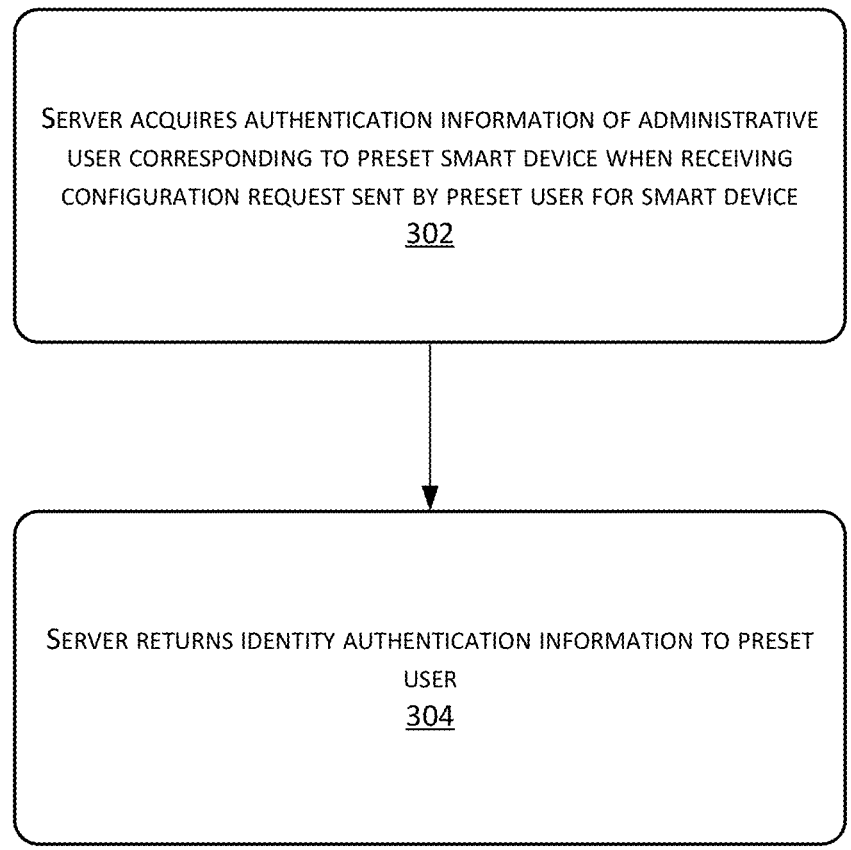
FIG. 3 is a flowchart of a device configuration method based on a server side according to an example embodiment of the present disclosure.

Correspondingly, FIG. 3 is a flowchart of a device configuration method based on a server side according to an example embodiment of the present disclosure. As shown in FIG. 3, the method is applied to a server, and may include the following steps:

In step 302, a server acquires identity authentication information of an administrative user corresponding to a preset smart device when receiving a configuration request sent by a preset user for the smart device.

In this example embodiment, the preset user may be an administrative user of a preset team, and the smart device is previously bound to the preset team. In other words, when the smart device is previously bound to the preset team, the server may authenticate the preset user who sends the configuration request, and return identity authentication information corresponding to the smart device to the preset user only when the preset user is an administrative user of the preset team, for ensuring the security of the configuration operation on the smart device.

In this example embodiment, the identity authentication information may include a standard digital digest corresponding to the smart device. The standard digital digest is related to a random code previously generated and uploaded by the smart device, and the random code is further recorded as a local random code on the smart device. By generating a random code on the smart device, the standard digital digest correspondingly generated may uniquely correspond to the smart device and high security and anti-cheating performances may be achieved because of its randomness. However, the identity authentication information may also include other content, such as a character string related to a user ID of the administrative user, as long as the authentication may be performed by the smart device accordingly, which is not limited in the present disclosure.

In an example embodiment, the standard digital digest may be a digital digest of the random code, that is, the server directly generates a corresponding digital digest for the random code as the standard digital digest. Correspondingly, after receiving the near-field communication signal sent by the preset user, the smart device also generates a corresponding digital digest for the recorded local random code as the corresponding local digital digest.

In another example embodiment, the standard digital digest may be a common digital digest of at least one of the following information and the random code: an activation code of the smart device, a serial number of the smart device, and identification information of a bound object of the smart device (for example, the bound object may be the foregoing preset team, and the corresponding identification information may be an Organization ID (or Org ID for short) of the preset team), thus increasing the complexity of the digital digest in the present disclosure to further improve the security. In particular, when the digital digest is generated from a plurality of types of information at the same time, there may be more combinations of the information, thus reducing the likelihood that the digital digest will be guessed.

In step 304, the server returns the identity authentication information to the preset user such that the preset user sends a near-field communication signal including the identity authentication information to the smart device, wherein the near-field communication signal is used for instructing the smart device to determine according to the identity authentication information that the preset user has an administrative permission, and establish a near-field communication connection with the sender device of the near-field communication signal to allow the sender device to configure the smart device.

In this example embodiment, when the identity authentication information includes a standard digital digest corresponding to the smart device, the near-field communication signal is used for instructing the smart device to generate a local digital digest related to the recorded local random code, and when the standard digital digest matches the local digital digest, it may be determined that the preset user has an administrative permission.

In this example embodiment, the server may further update the recorded standard digital digest according to an updated random code generated and uploaded by the smart device, and the updated random code is further used by the smart device to update the local random code. By updating the standard digital digest and the local random code, leaking of the standard digital digest or the local random code that causes hidden security dangers may be avoided, thus contributive to improve the security.

Figure 4:
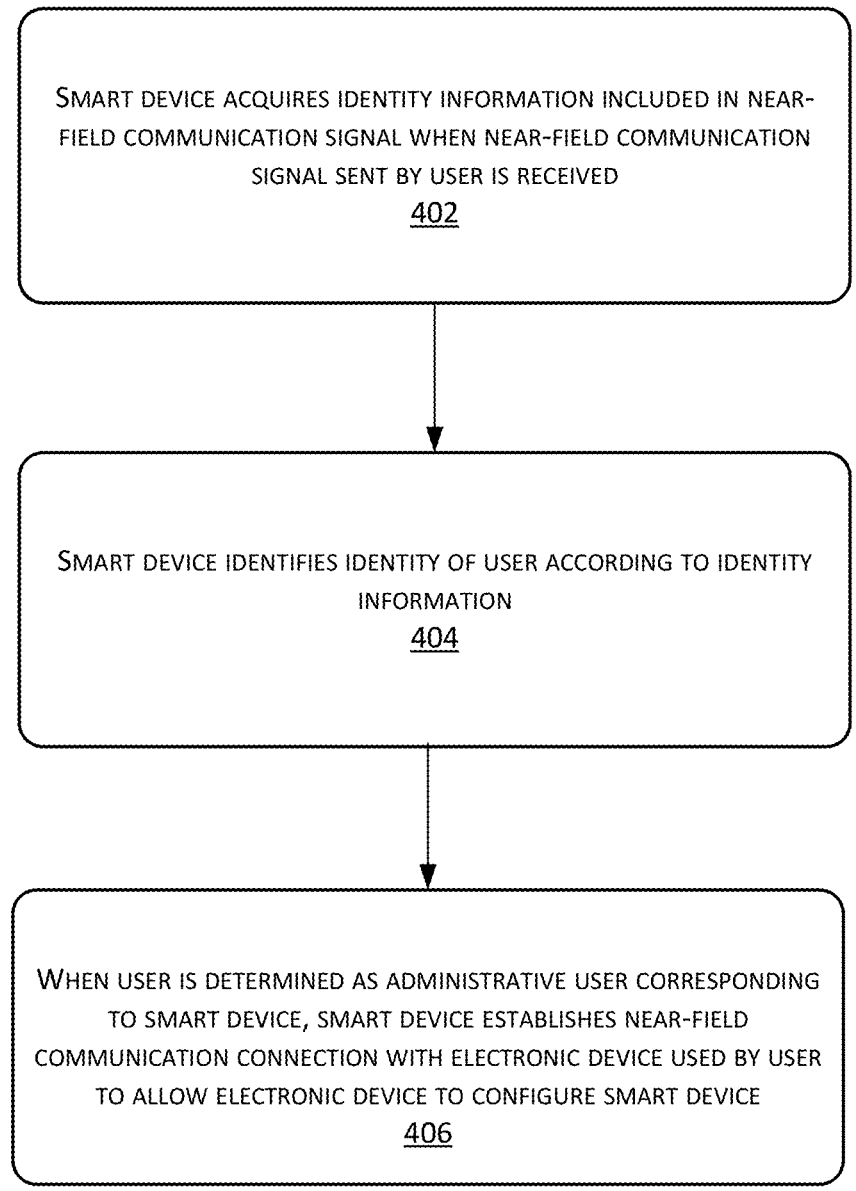
FIG. 4 is a flowchart of a device configuration method based on a smart device side according to an example embodiment of the present disclosure.

Correspondingly, FIG. 4 is a flowchart of a device configuration method based on a smart device side according to an example embodiment of the present disclosure. As shown in FIG. 4, the method is applied to a smart device, and may include the following steps:

In step 402, a smart device acquires identity information included in a near-field communication signal when the near-field communication signal sent by a user is received.

In step 404, the smart device identifies the identity of the user according to the identity information.

In step 406, when the user is determined as an administrative user corresponding to the smart device, the smart device establishes a near-field communication connection with an electronic device used by the user to allow the electronic device to configure the smart device.

In this example embodiment, the smart device may upload a generated random code to the server in advance, so that the server generates a standard digital digest related to the random code and sends the standard digital digest to a preset administrative user having an administrative permission to the smart device as identity information of the preset administrative user, wherein the random code is further recorded as a local random code of the smart device.

Correspondingly, when identifying the identity of the user, the smart device may generate a local digital digest related to the recorded local random code, and compare the local digital digest with a to-be-verified digital digest which is the identity information in the near-field communication signal. When the to-be-verified digital digest matches the local digital digest, the smart device determines the any user as the administrative user corresponding to the smart device.

In this example embodiment, when the to-be-verified digital digest is the same as the local digital digest, it indicates that the to-be-verified digital digest is the standard digital digest generated for the smart device at the server, then the user is determined as the administrative user, i.e., the user has the administrative permission to the smart device, and the administrative user is allowed to perform a configuration operation on the smart device when a configuration mode is switched to. When the to-be-verified digital digest is different from the local digital digest, it indicates that the user does not have an administrative permission and is not allowed to perform a configuration operation on the smart device.

In this example embodiment, the smart device may generate an activation code and upload it to the server in the process of initial activation and binding, and the configuration operation on the smart device may be implemented subsequently by using the activation code and the corresponding standard digital digest. Moreover, in order to improve the security and prevent the activation code or the standard digital digest from being leaked or stolen, the smart device may generate an updated random code and upload it to the server for updating the standard digital digest, and the updated random code may be further used for updating the local random code to invalidate the previously leaked or stolen activation code or standard digital digest.

In an example embodiment, the smart device may generate the updated random code according to a predefined cycle and upload it to the server, for example, the random code is updated daily, weekly, monthly or according to other cycles.

In another example embodiment, the smart device may generate an updated random code and upload it to the server upon completion of each configuration operation. For example, the smart device may determine that the configuration operation has been completed when the near-field communication connection with the user device is disengaged, and then generate and upload the updated random code. This is however not limited in the present disclosure. Then, even if the user device acquires a standard digital digest from the server, the standard digital digest may be stolen by another person. The stolen standard digital digest will be invalidated and cannot be applied to the configuration operation on the smart device as long as the user device completes configuration of the smart device and the smart device generates an updated activation code and uploads it to the server.

As may be seen from the foregoing technical solution, in the present disclosure, a smart device identifies the identity of a user who it is operating, so that only a user having an administrative permission may establish a near-field communication connection between a used electronic device and the smart device and perform a configuration operation, thus avoiding hidden security dangers when an irrelevant person triggers a related physical key in a hardware mode and contributive to enhance the security of the configuration operation.

Figure 5:
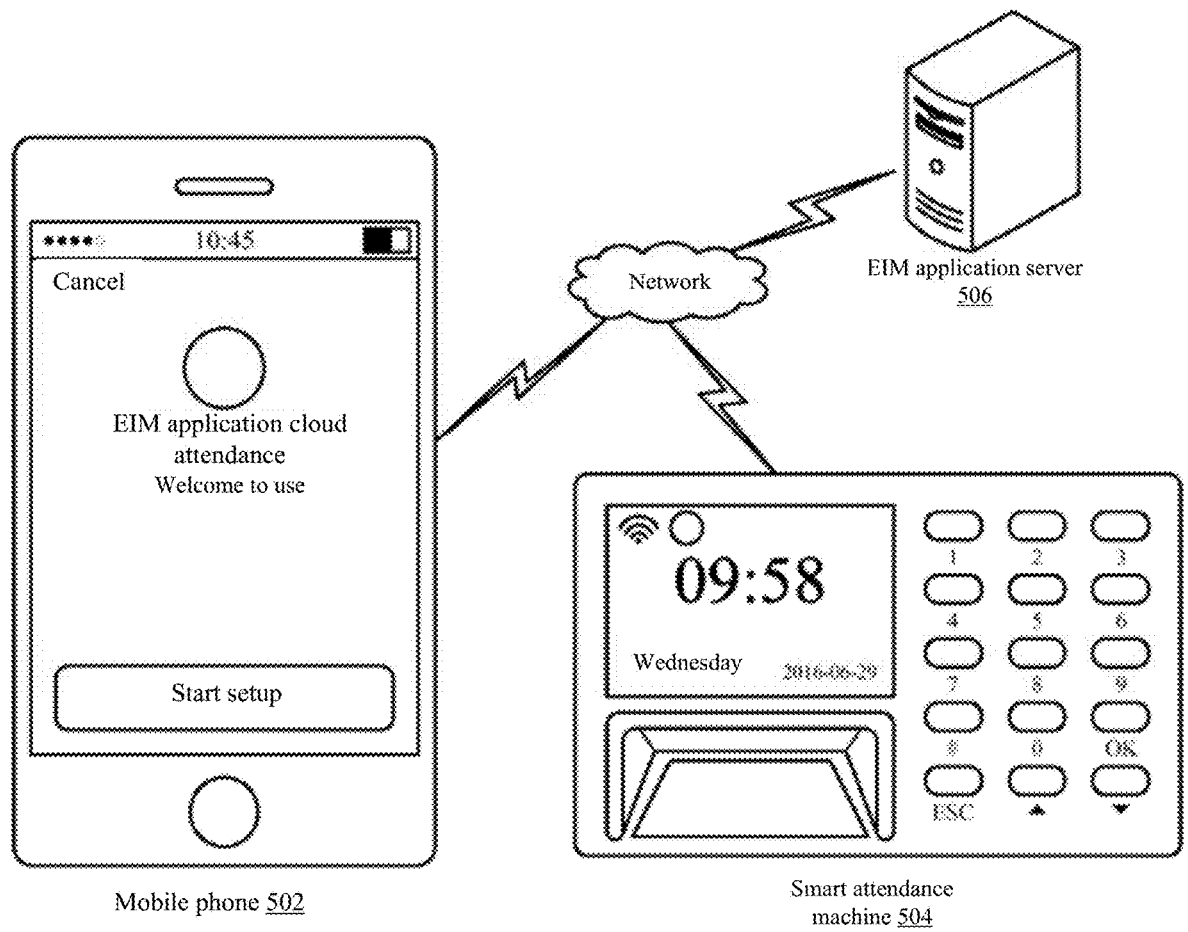
FIG. 5 is a schematic structural diagram of a device configuration system according to an example embodiment of the present disclosure.

In the following, for example, in an enterprise scenario, the technical solution of the present disclosure is described in detail on the assumption that an enterprise administrator A exists in an enterprise AA and the enterprise administrator A performs, through a mobile phone, a configuration operation on a smart attendance machine bound to the enterprise AA. FIG. 5 is a schematic structural diagram of a device configuration system according to an example embodiment of the present disclosure. As shown in FIG. 5, assuming that the system is supported by EIM application such as a mobile team office platform, the system includes a mobile phone 502 used by the enterprise administrator A, the smart attendance machine 504, and an EIM application server 506. An EIM application client terminal is run on the mobile phone and the smart attendance machine respectively, and an EIM application server terminal is run on the EIM application server. Instead of being provided with a RESET physical key, the smart attendance machine may be configured by software as an enterprise instant messaging application that provides a corresponding "soft switch" or "software switch."

The EIM application server may be a physical server including a separate host, a virtual server borne by a host cluster, or a cloud server. In the process of running, the EIM application server may run a server-side program of a certain application to implement a related service function of the application. For example, when running a program of a mobile team office platform, the EIM application server may be implemented as a server terminal of the mobile team office platform. However, in the technical solution of the present disclosure, the EIM application server runs a team information platform and centrally manages team information on the team information platform, including recording and maintaining team information from various teams and implementing interaction of team information among multiple teams.

The mobile phone is just a type of electronic device that may be used by the user. In practice, apparently, the user may also use the following types of electronic devices such as tablet devices, notebook computers, Personal Digital Assistants (PDAs), and wearable devices (such as smart glasses and smart watches), which are not limited in the present disclosure. In the process of running, the electronic device may run a client-terminal-side program of a certain application to implement a related service function of the application, such as the foregoing device configuration function. Similarly, the smart attendance machine may also run a client-terminal-side program of a certain application to implement a related service function of the application, such as the foregoing device configuration function.

Moreover, a network via which the mobile phone, the smart attendance machine, and the EIM application server interact with each other may include a variety of types of wired or wireless networks. In an example embodiment, the network may include a Public Switched Telephone Network (PSTN) and the Internet.

Figure 6:
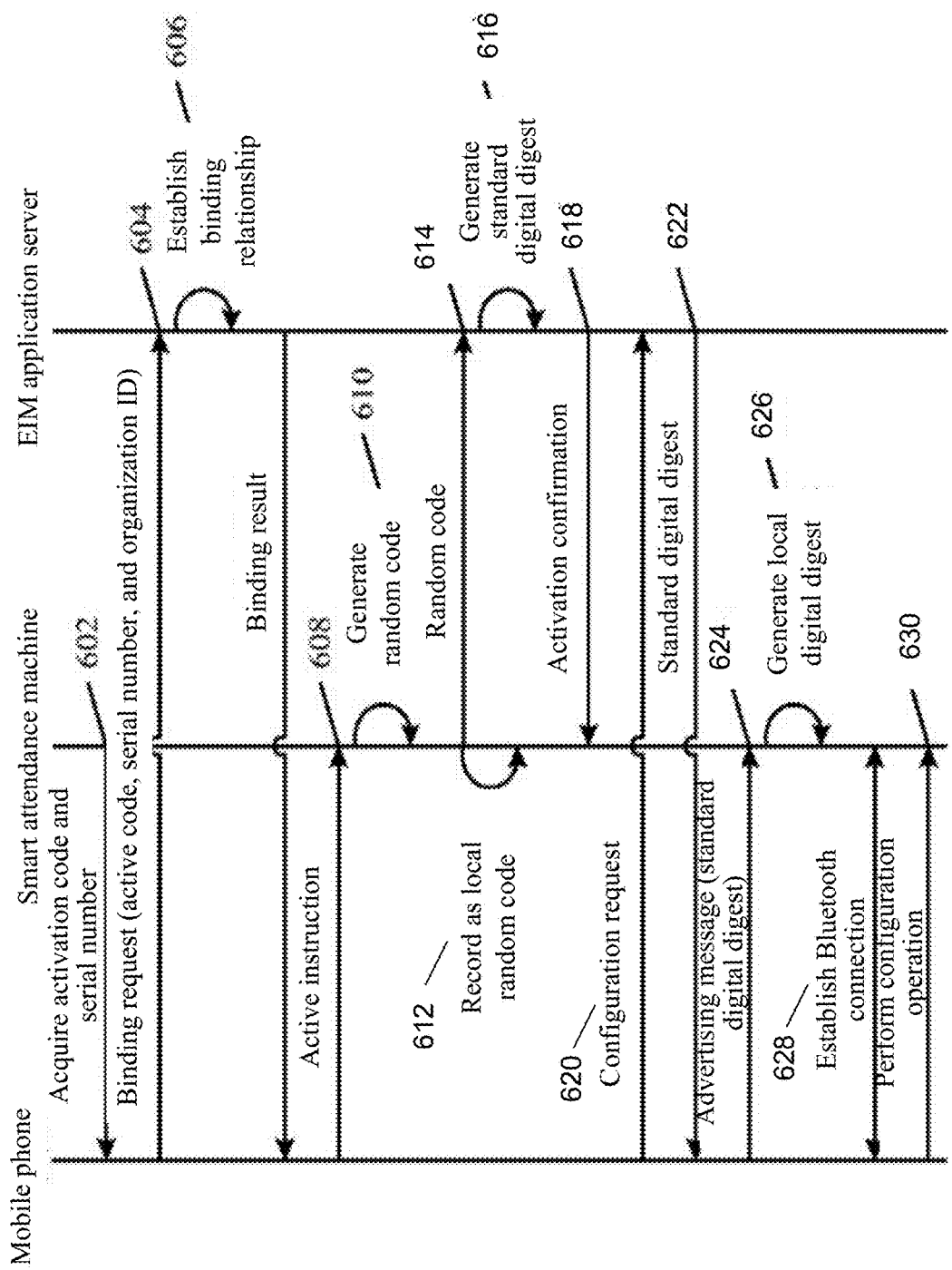
FIG. 6 is a flowchart of a device configuration method according to an example embodiment of the present disclosure.

For example, the system as shown in FIG. 5 may configure the smart attendance machine through the device configuration method shown in FIG. 6. The method may include the following steps.

In step 602, a mobile phone acquires an activation code, a serial number, and other information of a smart attendance machine.

In this example embodiment, the description of "a mobile phone acquires" actually means that an EIM application client terminal run on the mobile phone performs an "acquisition" operation. However, this process needs to be supported by hardware of the mobile phone. This applies similarly to other parts of the present disclosure.

In this example embodiment, the smart attendance machine determines an activation code, a serial number, and other information corresponding to itself first in the following manners, taking the activation code as an example (which applies similarly to the serial number).

In one situation, the smart attendance machine may check whether an activation code exists in a storage space after initial boot. If the activation code does not exist, the smart attendance machine sends an activation code acquisition request to the EIM application server so that the EIM application server allocates a uniquely corresponding activation code to the smart attendance machine, and the EIM application server will establish a unique mapping relationship between the activation code and the smart attendance machine.

In another situation, the smart attendance machine has stored its own activation code in the storage space before leaving the factory, and the foregoing unique mapping relationship has also been recorded on the EIM application server. Thus, the smart attendance machine does not need to acquire the activation code from the EIM application server.

The same activation code may be applied to the smart attendance machine all the time. Alternatively, the smart attendance machine may proactively age the activation code in the storage space according to a preset cycle and re-request a new activation code from the EIM application server, and then the EIM application server may replace the old activation code (that is, the aged activation code) with the new activation code and update the foregoing unique mapping relationship.

Figure 7:
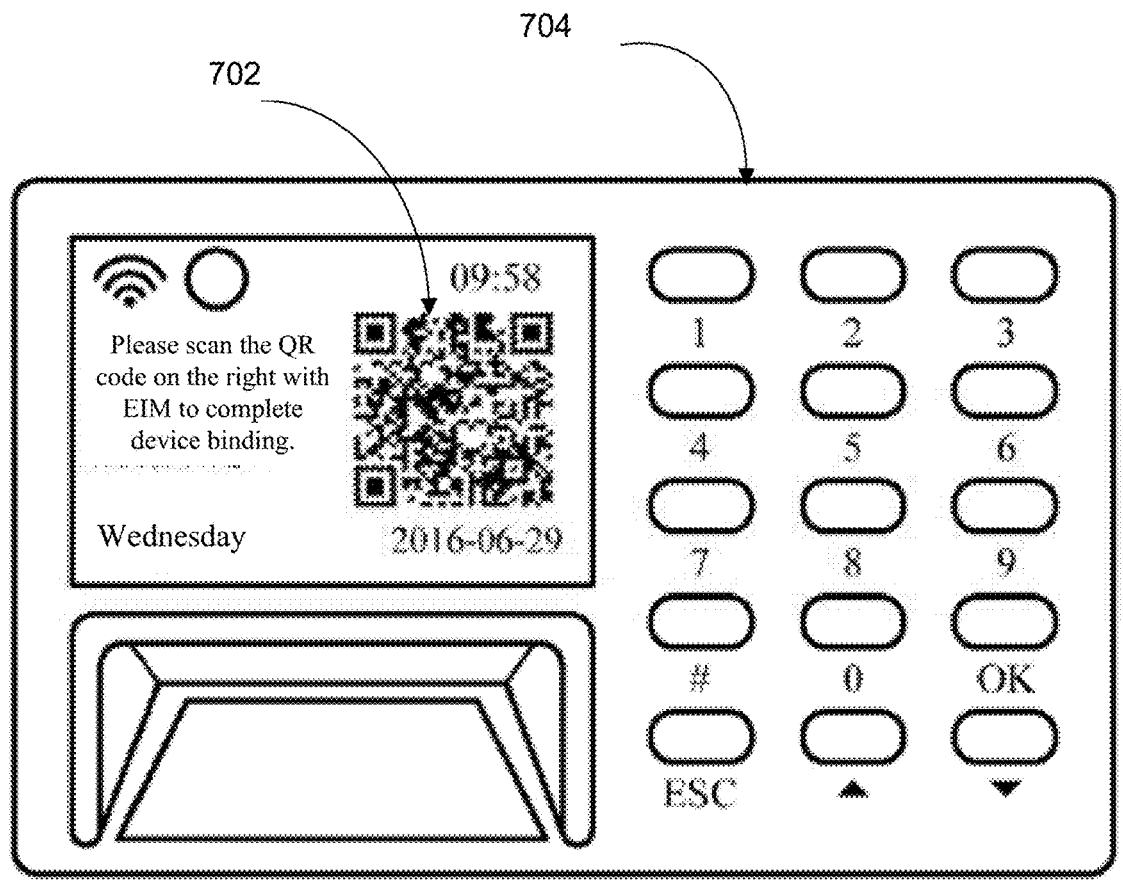
FIG. 7 is a schematic structural diagram of a smart attendance machine according to an example embodiment of the present disclosure.

In an example embodiment, the activation code, the serial number, and other information may be represented as a QR code 702 or a graphic code in another form as shown in FIG. 7, and the smart attendance machine 704 may directly display the graphic code. Alternatively, the activation code, the serial number, and other information may be a character string or non-graphical information in another form, and the smart attendance machine may display the character string directly, or convert the character string and display the converted graphic code shown in FIG. 7. However, the activation code may also be in another form, and the smart attendance machine may also display the activation code in more manners, which is not limited in the present disclosure. Then, the mobile phone may acquire the activation code, the serial number, and other information of the smart attendance machine in the following manners.

In one situation, when the activation code on the smart attendance machine is in the form of a graphic code, a camera component on the mobile phone may be started to collect the graphic code through a "code scanning" function of the EIM application client terminal run on the mobile phone, and then content of the activation code is read by content recognition. By taking the activation code as an example, after the QR code 702 shown in FIG. 7 is read, an activation code corresponding to the QR code 702 may be recognized as "gfd1s5g451f24sg54sg241fd1."

In another situation, when the activation code on the smart attendance machine is in the form of a character string, a camera component on the mobile phone may be started to collect the character string through a related function of the EIM application client terminal run on the mobile phone, and then the character string is recognized by Optical Character Recognition (OCR) or the like. However, the EIM application client terminal run on the mobile phone may also show an input box, so that the enterprise administrator A may manually input the character string shown on the smart attendance machine into the mobile phone to help the mobile phone to complete a reading operation on the character string.

In another example embodiment, a near-field communication connection may be established between the mobile phone and the smart attendance machine, and the mobile phone acquires the activation code, the serial number, and other information from the smart attendance machine through the near-field communication connection. For example, the smart attendance machine may continuously transmit an advertising message. For example, the advertising messages may be sent based on the iBeacon protocol of the BLE technology, and the mobile phone may establish a Bluetooth connection between the mobile phone and the smart attendance machine by scanning and responding to the advertising message. Then, the enterprise administrator A may input login information (such as a login account and a password that are usually recorded in a housing or instruction of the smart attendance machine) for the smart attendance machine to the mobile phone, so that the smart attendance machine returns the activation code, the serial number, and other information to the mobile phone after it is determined that the mobile phone (i.e., the enterprise administrator A) has a related permission.

In step 604, the mobile phone sends a binding request for the smart attendance machine to the EIM application server, and the binding request includes the activation code, the serial number, and other information of the smart attendance machine, as well as an organization ID of the enterprise AA that is expected to be bound to the smart attendance machine.

In step 606, the EIM application server establishes a binding relationship between the smart attendance machine and the enterprise AA according to the foregoing binding request.

Figure 8:
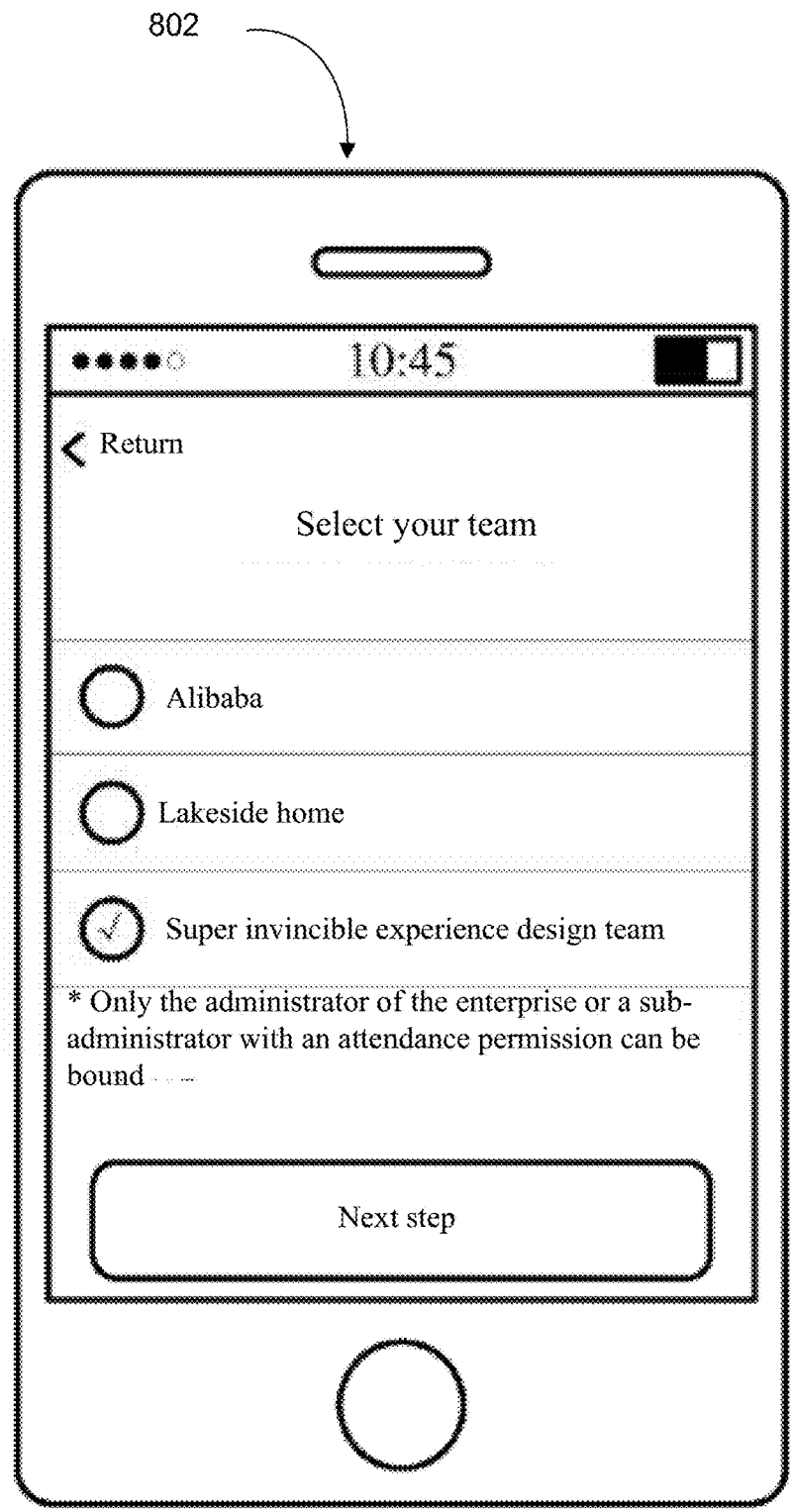
FIG. 8 is a schematic diagram of a page for binding a smart attendance machine according to an example embodiment of the present disclosure.

In an example embodiment, the mobile phone 802 may show a team selection page as shown in FIG. 8. The team selection page includes all teams associated with the enterprise administrator A. Then, the mobile phone may determine one or more selected teams in the team selection page according to a received user selection instruction, and add organization IDs of the selected teams to the foregoing binding request.

In another example embodiment, the EIM application client terminal on the mobile phone may determine the number of the teams associated with the enterprise administrator A. When there is only one associated team, the EIM application client terminal may directly add an organization ID of the team to the foregoing binding request without showing the team selection page as shown in FIG. 8. When there are multiple associated teams, the EIM application client terminal may show the team selection page as shown in FIG. 8 and perform processing according to a user selection instruction, which will not be elaborated here.

In step 608, the mobile phone sends an active instruction to the smart attendance machine when a binding result returned by the EIM application server and indicating a successful binding is received.

In this example embodiment, after the EIM application server establishes a binding relationship between the smart attendance machine and the enterprise AA, only an enterprise member having an administrative permission to the enterprise AA such as the enterprise administrator A may perform a control operation for the smart attendance machine, for example, the configuration operation for the smart attendance machine.

In step 610, the smart attendance machine generates a random code for the received active instruction.

In this example embodiment, the smart attendance machine may generate a random code in line with a preset rule according to a built-in predefined algorithm. The random code has uniqueness and randomness, so it is difficult to be imitated and guessed and has extremely high information security.

In step 612, the smart attendance machine records the random code as a local random code.

In step 614, the smart attendance machine sends the random code to the EIM application server. Step 612 and t614 may occur concurrently or sequentially.

In this example embodiment, after the EIM application server receives the foregoing binding request and binds the smart attendance machine to the enterprise AA, it will not terminate this binding process, but continue to wait for receiving the random code uploaded by the smart attendance machine.

In step 616, the EIM application server generates a digital digest such as a standard digital digest related to the random code, and associatively records it with the enterprise AA and the smart attendance machine.

In this example embodiment, the smart attendance machine records the random code as a local random code to establish a unique correspondence between the local random code and the smart attendance machine. At the same time, the EIM application server associatively records the standard digital digest corresponding to the random code with the enterprise AA and the smart attendance machine to establish a unique correspondence among the standard digital digest, the enterprise AA, and the smart attendance machine. Then, a unique correspondence between the enterprise administrator A and the smart attendance machine may be determined according to a matching relationship between the standard digital digest and the local random code and the administrative permission to the enterprise AA that the enterprise administrator A has, so that the enterprise administrator A may perform a configuration operation on the smart attendance machine.

In step 618, after completing recording of the standard digital digest, the EIM application server returns activation confirmation to the smart attendance machine.

In this example embodiment, after receiving the activation confirmation, the smart attendance machine may disengage the communication connection with the EIM application server, and the EIM application server completes binding processing on the smart attendance machine. In practice, normal attendance processing may be completed by the smart attendance machine entirely locally without conducting network communication with the EIM application server. Therefore, even if the smart attendance machine is installed in an area with a poor network environment after binding, the attendance processing function of the smart attendance machine still will not be affected.

In step 620, the enterprise administrator A initiates a configuration request for the smart attendance machine to the EIM application server through the mobile phone.

In step 622, the EIM application server returns a standard digital digest corresponding to the smart attendance machine based on the configuration request.

In this example embodiment, as the enterprise administrator A has an administrative permission to the enterprise AA, the enterprise administrator A may request the standard digital digest corresponding to the smart attendance machine from the EIM application server. Other enterprise members not having the administrative permission cannot obtain the standard digital digest, thus preventing an irrelevant person from configuring the smart attendance machine and avoiding hidden security dangers and risks caused by using the physical key in the conventional techniques.

In step 624, the mobile phone transmits an advertising message to the surrounding, and the advertising message includes the foregoing standard digital digest.

In this example embodiment, after acquiring the foregoing standard digital digest from the EIM application server, the mobile phone may store the standard digital digest in the cache space of the mobile phone. Even if the mobile phone is in a state of a poor network environment and cannot establish an effective communication connection with the EIM application server, the enterprise administrator A still may perform the configuration operation on the smart attendance machine through the mobile phone at any time, thus greatly improving the convenience of configuring the smart attendance machine.

In step 626, when the advertising message from the mobile phone is received, the smart attendance machine generates a local digital digest related to the previously stored local random code according to the local random code.

In step 628, when the digital digest included in the advertising message matches the local digital digest, a Bluetooth connection is established between the smart attendance machine and the mobile phone so that, in step 630, the enterprise administrator A may perform the configuration operation on the smart attendance machine through the mobile phone.

In this example embodiment, the same random code is uploaded to the EIM application server and locally recorded at the smart attendance machine respectively. The random code has uniqueness and uniquely corresponds to the smart attendance machine. As a result, the EIM application server generates a standard digital digest related to the random code on the one hand, and the smart attendance machine should process the local random code with the same algorithm to obtain a local digital digest on the other hand. Then, the corresponding standard digital digest is also the same as the local digital digest as identical random codes and algorithms are used. In addition, since when the smart attendance machine is bound to the enterprise AA, only the enterprise administrator A of the enterprise AA (however, there may be multiple enterprise administrators having administrative permissions in the enterprise AA in another example embodiment) has the related administrative permission and may acquire the standard digital digest from the EIM application server through the above step 618, a sender of the advertising message may be determined as the enterprise administrator A when the digital digest included in the advertising message matches the local digital digest. Thus, the sender device of the advertising message is allowed to establish a Bluetooth connection with the smart attendance machine to implement the configuration operation on the smart attendance machine.

The EIM application server and the smart attendance machine may adopt an MD5 (MD means Message Digest)

algorithm or any other digital digest algorithms respectively, which is not limited in the present disclosure, as long as it is ensured that the EIM application server and the smart attendance machine adopt the same algorithm. During calculation, taking the EIM application server as an example, in one situation, a digital digest corresponding to the random code may be directly calculated as the foregoing standard digital digest; in another situation, the random code and at least one of the following information may be combined to calculate a digital digest corresponding to the combined information: an activation code of the smart attendance machine, a serial number of the smart attendance machine, an organization ID of the enterprise AA, and so on.

In this example embodiment, the digital digest included in the advertising message is matched with the local digital digest by the smart attendance machine, and it is determined accordingly whether the sender corresponding to the advertising message has an administrative permission, so that the participation of the EIM application server is not required in the entire process. The smart attendance machine has no requirements for the network environment, which allows the enterprise administrator A to implement the configuration operation on the smart attendance machine only in a near-field communication environment, thus avoiding problems such as high delay, easy data packet loss, and reduction of the security caused by a poor network environment.

At the same time, the sender device of the advertising message has to be located near the smart attendance machine in a near-field communication condition, and especially in a team scenario, the smart device such as the smart attendance machine is often installed in an internal work area of the team, and thus a security risk of the configuration of the smart device by most non-team members may be eliminated.

Further, in order to improve the security and prevent the activation code or the standard digital digest from being leaked or stolen, or when the mobile phone where the standard digital digest is stored is lost or stolen, the smart attendance machine may generate an updated random code and upload it to the EIM application server so that the EIM application server updates a previously recorded standard digital digest. The updated random code is further used for updating the local random code recorded on the smart attendance machine to invalidate the previously leaked or stolen activation code and standard digital digest.

In one situation, the smart attendance machine may generate the updated random code according to a predefined cycle and upload it to the EIM application server, for example, the random code is updated daily, weekly, monthly or according to other cycles. In another example embodiment, the smart attendance machine may generate an updated random code and upload it to the EIM application server upon completion of each configuration operation. For example, the smart attendance machine may determine that the configuration operation has been completed when the Bluetooth connection with the mobile phone is disengaged after step 624, and then generate and upload the updated random code. However, this is not limited in the present disclosure. Then, even if the standard digital digest may be stolen by another person, the stolen standard digital digest will be invalidated and cannot be applied to the configuration operation on the smart device as long as the smart attendance machine generates an updated activation code and uploads it to the EIM application server.

In summary, in the present disclosure, a configuration operation on a smart device may be implemented completely by near-field communication between an electronic device and the smart device without the installation of a physical key on the smart device, thus avoiding hidden security dangers and risks brought about by the physical key and improving the convenience of the configuration operation on the smart device.

Figure 9:
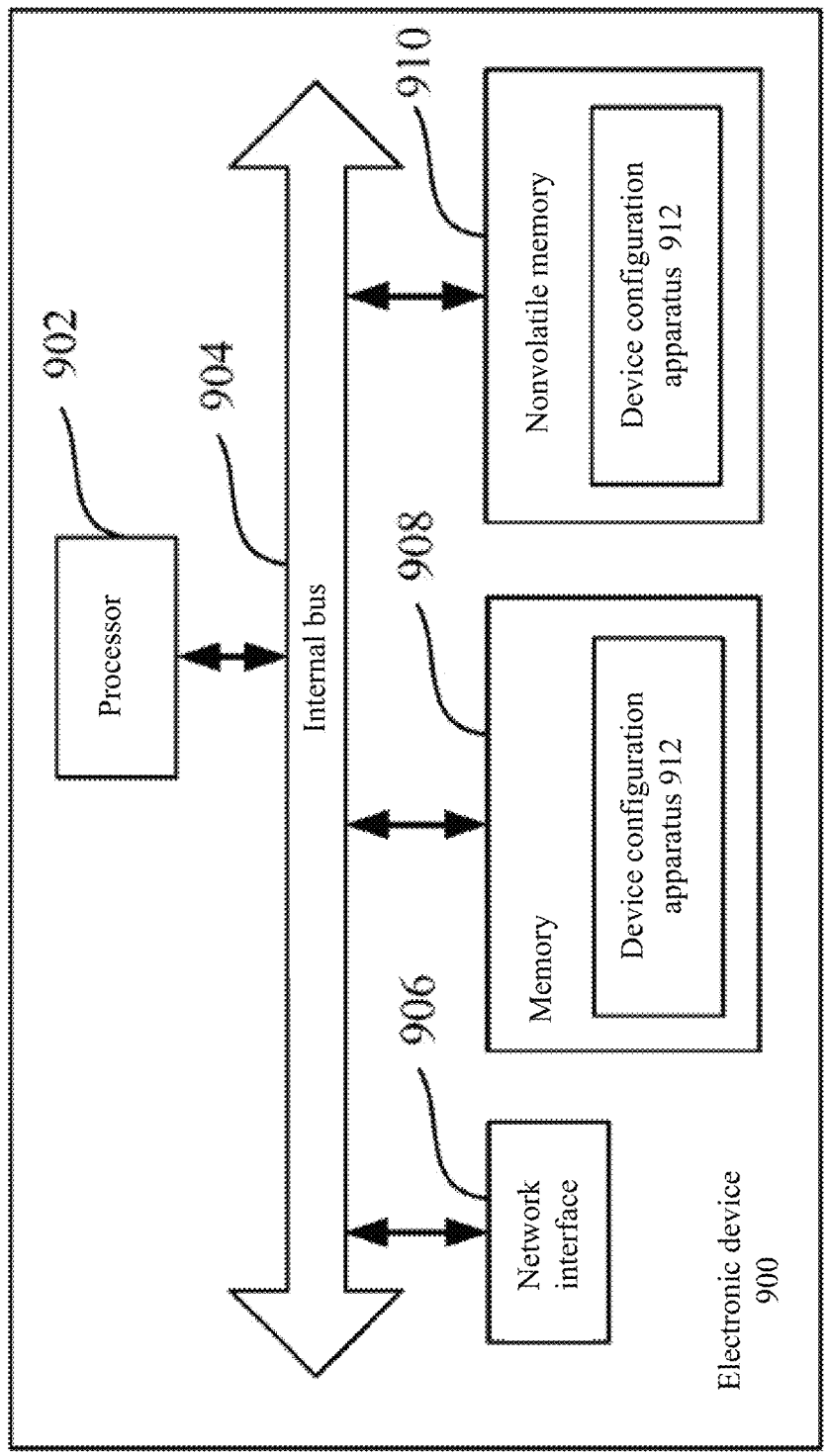
FIG. 9 is a schematic structural diagram of an electronic device based on a user side according to an example embodiment of the present disclosure.

FIG. 9 is a schematic structural diagram of an electronic device 900 according to an example embodiment of the present disclosure. Referring to FIG. 9, in terms of hardware, the electronic device includes a processor 902, an internal bus 904, a network interface 906, a memory 908, and a nonvolatile memory 910, and apparently may also include hardware required by other services. The processor 902 reads a corresponding computer program from the nonvolatile memory 910 into the memory 908 and then runs the computer program, forming a device configuration apparatus 912 in terms of logic. However, in addition to the software implementation manner, other implementation manners such as logic devices and a combination of software and hardware are not excluded in the present disclosure. In other words, the following processing procedure is performed by, but not limited to, various logic units, and may also be performed by hardware or logic devices.

Figure 10:
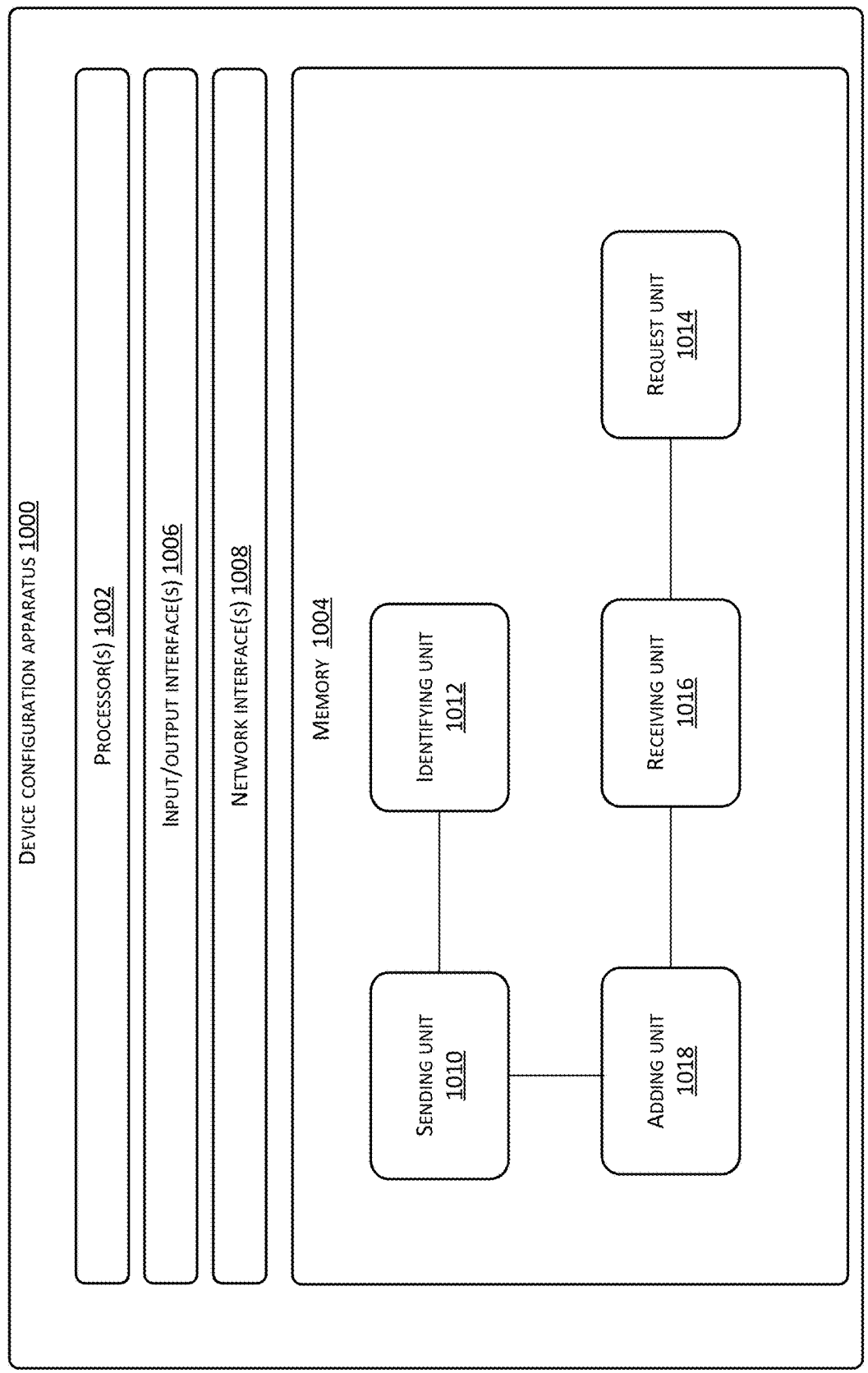
FIG. 10 is a block diagram of a device configuration apparatus based on a user side according to an example embodiment of the present disclosure.

Referring to FIG. 10, a device configuration apparatus 1000 includes one or more processor(s) 1002 or data processing unit(s) and memory 1004. The device configuration apparatus 1000 may further include one or more input/output interface(s) 1006 and one or more network interface(s) 1008. The memory 1004 is an example of computer readable medium or media.

The memory 1004 may store therein a plurality of modules or units including a sending unit 1010 and an identifying unit 1012.

The sending unit 1001 is configured to make user device send a near-field communication signal including identity information of a logged-in user to a smart device, for instructing the smart device to identify the identity of the logged-in user.

The identifying unit 1002 is configured to make the user device determine according to a response of the smart device to the near-field communication signal that the smart device determines the logged-in user as an administrative user corresponding to the smart device, and establish a near-field communication connection with the smart device to configure the smart device.

For example, the device configuration apparatus 1000 further includes the following modules or units stored on memory 1004:

a request unit 1014 configured to make the user device send a configuration request for the smart device to a server, the configuration request being used for instructing the server to return a standard digital digest corresponding to the smart device;

a receiving unit 1016 configured to make the user device receive the standard digital digest returned by the server as the identity information of the logged-in user, wherein the standard digital digest is related to a random code previously generated and uploaded by the smart device, and the random code is further recorded as a local random code on the smart device; and an adding unit 1018 configured to make the user device add the standard digital digest to the near-field communication signal as the identity information, for instructing the smart device to generate a local digital digest related to the recorded local random code, and when the standard digital digest matches the local digital digest, establish a near-field communication connection with the sender device of the near-field communication signal in response to the near-field communication signal to allow the sender device to configure the smart device.

For example, the smart device is bound to a preset team; the configuration request includes identity information of a local user, for instructing the server to return the standard digital digest corresponding to the smart device when the identity information matches the administrative user of the preset team.

Figure 11:
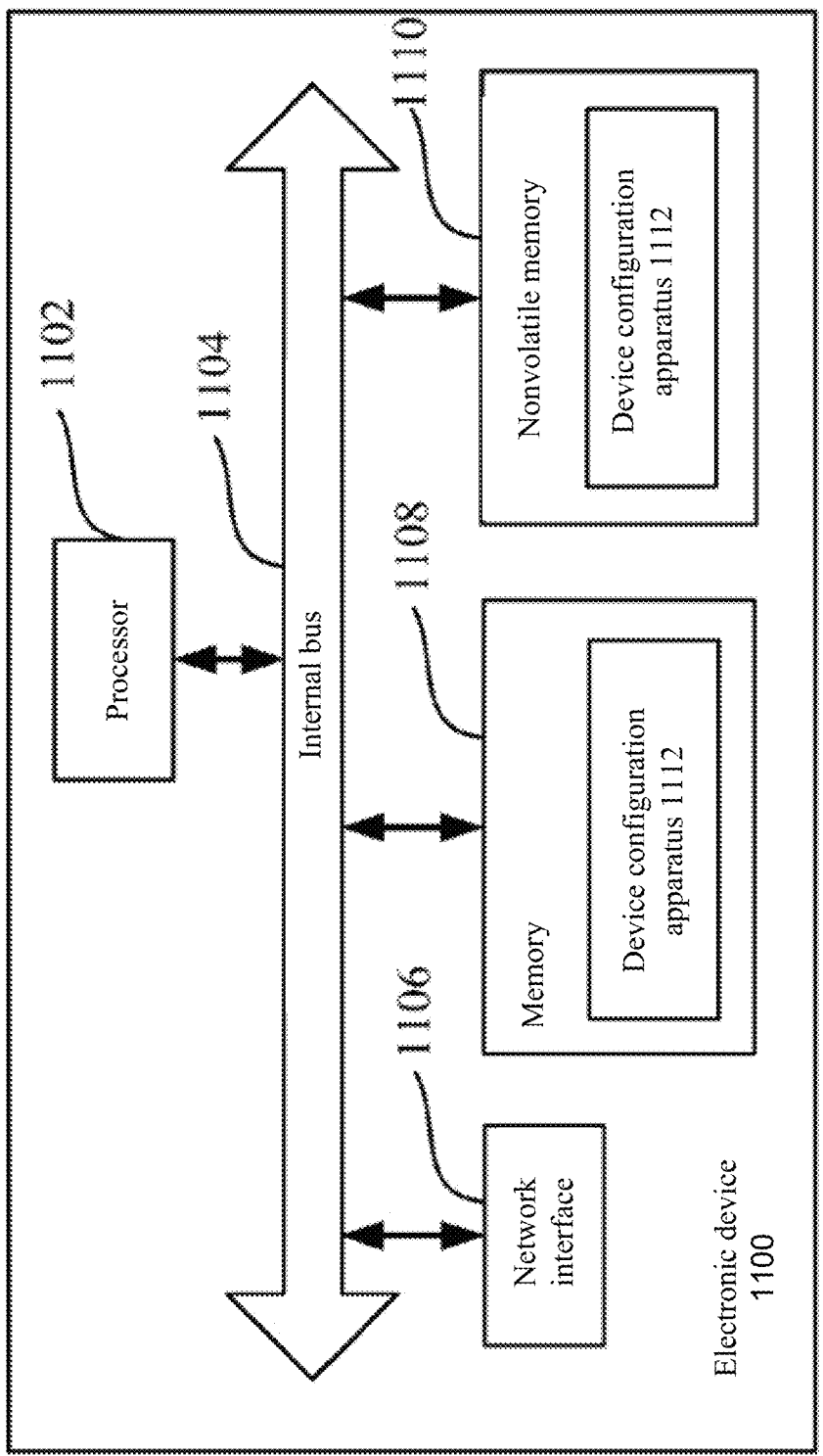
FIG. 11 is a schematic structural diagram of an electronic device based on a server side according to an example embodiment of the present disclosure.

FIG. 11 is a schematic structural diagram of an electronic device according to an example embodiment of the present disclosure. Referring to FIG. 11, in terms of hardware, the electronic device includes a processor 1102, an internal bus 1104, a network interface 1106, a memory 1108, and a nonvolatile memory 1110, and apparently may also include hardware required by other services. The processor 1102 reads a corresponding computer program from the nonvolatile memory 1110 into the memory 1108 and then runs the computer program, forming a device configuration apparatus 1112 in terms of logic. However, in addition to the software implementation manner, other implementation manners such as logic devices and a combination of software and hardware are not excluded in the present disclosure. In other words, the following processing procedure is performed by, but not limited to, various logic units, and may also be performed by hardware or logic devices.

Figure 12:
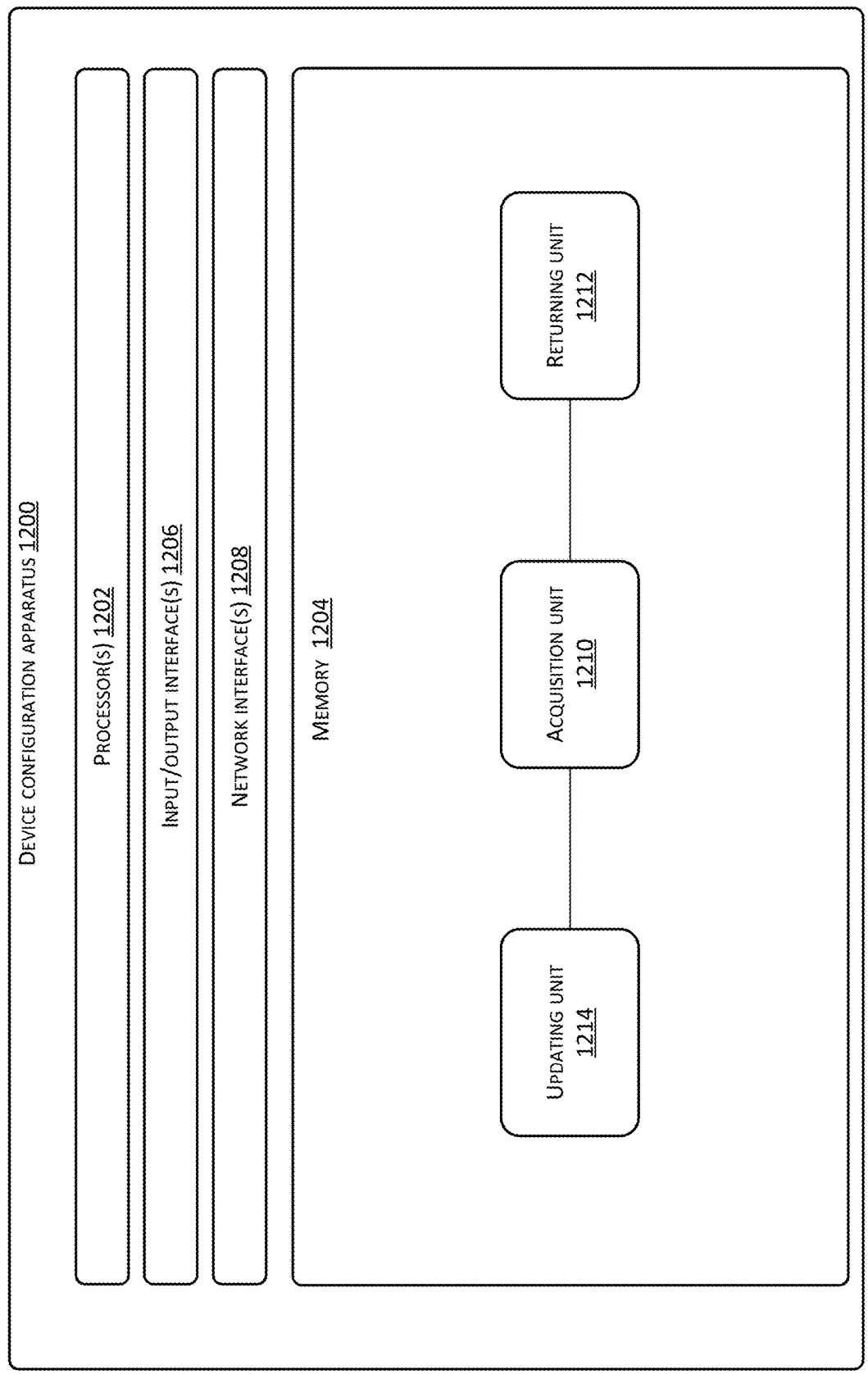
FIG. 12 is a block diagram of a device configuration apparatus based on a server side according to an example embodiment of the present disclosure.

Referring to FIG. 12, a device configuration apparatus 1200 includes one or more processor(s) 1202 or data processing unit(s) and memory 1204. The device configuration apparatus 1200 may further include one or more input/output interface(s) 1206 and one or more network interface(s) 1208. The memory 1204 is an example of computer readable medium or media.

The memory 1204 may store therein a plurality of modules or units including an acquisition unit 1210 and a returning unit 1212.

The acquisition unit 1210 is configured to make a server acquire identity authentication information of an administrative user corresponding to a preset smart device when a configuration request sent by a preset user for the smart device is received.

The returning unit 1212 is configured to make the server return the identity authentication information to the preset user such that the preset user sends a near-field communication signal including the identity authentication information to the smart device, wherein the near-field communication signal is used for instructing the smart device to determine according to the identity authentication information that the preset user has an administrative permission, and establish a near-field communication connection with a sender device of the near-field communication signal to allow the sender device to configure the smart device.

For example, the identity authentication information includes a standard digital digest corresponding to the smart device, the standard digital digest is related to a random code previously generated and uploaded by the smart device, and the random code is further recorded as a local random code on the smart device, wherein the near-field communication signal is used for instructing the smart device to generate a local digital digest related to the recorded local random code, and when the standard digital digest matches the local digital digest, it is determined that the preset user has an administrative permission.

For example, the preset user is an administrative user of a preset team, and the smart device is previously bound to the preset team.

For example, the standard digital digest is a digital digest of the random code;

or the standard digital digest is a common digital digest of at least one of the following information and the random code: an activation code of the smart device, a serial number of the smart device, and identification information of a bound object of the smart device.

For example, the device configuration apparatus 1200 further includes the following module or unit stored in the memory 1204:

an updating unit 1214 configured to make the server update the recorded standard digital digest according to an updated random code generated and uploaded by the smart device, wherein the updated random code is further used by the smart device to update the local random code.

Figure 13:
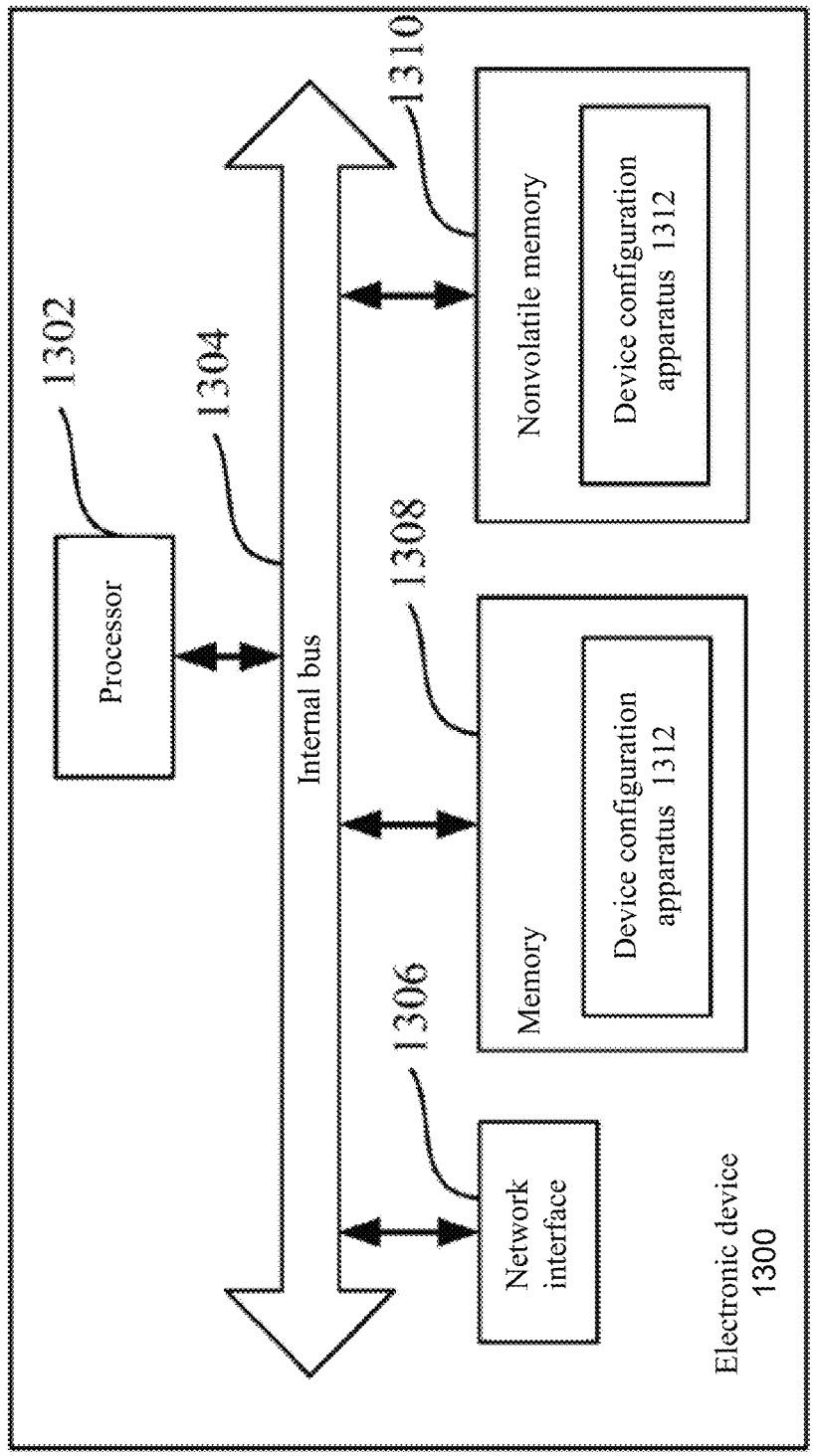
FIG. 13 is a schematic structural diagram of an electronic device based on a smart device side according to an example embodiment of the present disclosure.

FIG. 13 is a schematic structural diagram of an electronic device 1300 according to an example embodiment of the present disclosure. Referring to FIG. 13, in terms of hardware, the electronic device includes a processor 1302, an internal bus 1304, a network interface 1306, a memory 1308, and a nonvolatile memory 1310, and apparently may also include hardware required by other services. The processor 1302 reads a corresponding computer program from the nonvolatile memory 1310 into the memory 1308 and then runs the computer program, forming a device configuration apparatus 1312 in terms of logic. However, in addition to the software implementation manner, other implementation manners such as logic devices and a combination of software and hardware are not excluded in the present disclosure. In other words, the following processing procedure is performed by, but not limited to, various logic units, and may also be performed by hardware or logic devices.

Figure 14:
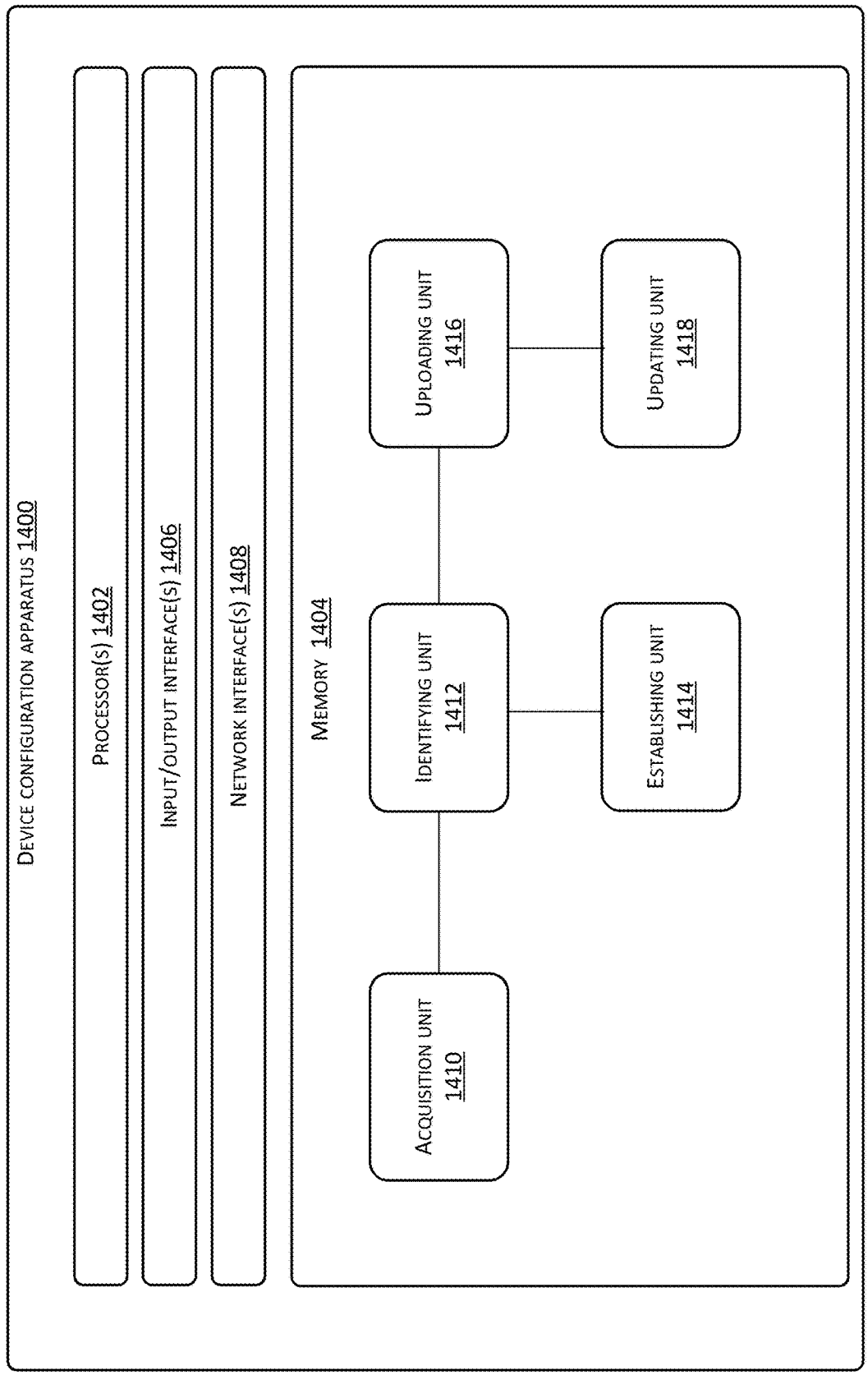
FIG. 14 is a block diagram of a device configuration apparatus based on a smart device side according to an example embodiment of the present disclosure.

Referring to FIG. 14, a device configuration apparatus 1400 includes one or more processor(s) 1402 or data processing unit(s) and memory 1404. The device configuration apparatus 1400 may further include one or more input/output interface(s) 1406 and one or more network interface(s) 1408. The memory 1404 is an example of computer readable medium or media.

The memory 1404 may store therein a plurality of modules or units including may include an acquisition unit 1410, an identifying unit 1412, and an establishing unit 1414.

The acquisition unit 1410 is configured to make a smart device acquire identity information included in a near-field communication signal when the near-field communication signal sent by any user is received.

The identifying unit 1412 is configured to make the smart device identify the identity of the user according to the identity information.

The establishing unit 1414 is configured to, when the user is determined as an administrative user corresponding to the smart device, make the smart device establish a near-field communication connection with an electronic device used by the user to allow the electronic device to configure the smart device.

For example, the device configuration apparatus 1400 further includes: an uploading unit 1416 stored in the memory 1404, which is configured to make the smart device upload a generated random code to a server so that the server generates a standard digital digest related to the random code and sends the standard digital digest to a preset administrative user having an administrative permission to the smart device as identity information of the preset administrative user, wherein the random code is further recorded as a local random code of the smart device; and the identifying unit 1412 is configured to generate, by the smart device, a local digital digest related to the recorded local random code, and compare the local digital digest with a to-be-verified digital digest that is the identity information in the near-field communication signal, wherein when the to-be-verified digital digest matches the local digital digest, the smart device determines the user as the administrative user corresponding to the smart device.

For example, the device configuration apparatus 1400 further includes an updating unit 1418 stored in the memory 1404 configured to make the smart device generate an updated random code and upload it to the server so that the server updates the standard digital digest, wherein the updated random code is further used for updating the local random code.

For example, the updating unit 1418 is configured to:

generate the updated random code according to a predefined cycle and upload it to the server;

or generate the updated random code and upload it to the server after completion of a configuration operation.

The systems, apparatuses, modules or units illustrated in the foregoing example embodiments may be implemented by a computer chip or an entity, or implemented by a product having a specific function. A typical implementation device is a computer. For example, the computer may be a personal computer, a laptop computer, a cellular phone, a camera phone, a smart phone, a personal digital assistant, a media player, a navigation device, an email transceiver, a game console, a tablet computer, a wearable device, or a combination of any of these devices.

In a typical configuration, the computer includes one or more central processing units (CPUs), an input/output interface, a network interface, and a memory.

The memory may include computer readable media such as a volatile memory, a Random-Access Memory (RAM), and/or a non-volatile memory, e.g., a Read-Only Memory (ROM) or a flash RAM. The memory is an example of a computer readable medium.

The computer readable medium includes non-volatile and volatile media as well as movable and non-movable media, and may implement information storage by means of any method or technology. The information may be a computer readable instruction, a data structure, and a module of a program or other data. An example of the storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory media, such as a modulated data signal and a carrier wave.

It should be further noted that the terms "include," "comprise" or other variations thereof are intended to cover non-exclusive inclusion, so that a process, method, commodity or device including a series of elements not only includes the elements, but also includes other elements not explicitly listed, or further includes elements inherent to the process, method, commodity or device. In the absence of more limitations, an element defined by "including a/an . . . " does not exclude that the process, method, commodity or device including the element further has other identical elements.

Example embodiments will be described in detail herein, and examples thereof are shown in the accompanying drawings. In the following description involving the accompanying drawings, the same numerals in different accompanying drawings denote the same or similar elements, unless specified otherwise. Implementation manners described in the following example embodiments do not represent all implementation manners consistent with the present disclosure. In contrast, they are merely examples of apparatuses and methods consistent with some aspects of the present disclosure as described in detail in the appended claims.

Terms used in the present disclosure are merely used for describing specific example embodiments, instead of limiting the present disclosure. Singular forms "a(n)", "said", and "the" used in the present disclosure and the appended claims also include plural forms, unless clearly specified in the context that other meanings are denoted. It should be further understood that the term "and/or" used herein refers to and includes any or all possible combinations of one or more associated items listed.

It should be understood that, although terms such as "first," "second," and "third" may be used to describe various kinds of information in the present disclosure, these kinds of information should not be limited to the terms. These terms are merely used to distinguish information of the same type from each other. For example, without departing from the scope of the present disclosure, the first information may also be referred to as second information, and similarly, the second information may also be referred to as first information. Depending on the context, the word "if" used herein may be explained as "when . . . ", "as . . . ", or "in response to the determination".

The above descriptions are merely example embodiments of the present disclosure, but not intended to limit the present disclosure. Any modification, equivalent replacement, and improvement made without departing from the spirit and principle of the present disclosure shall fall within the protection scope of the present disclosure.

The present disclosure may further be understood with clauses as follows.

Clause 1. A device configuration system, comprising: a user device of a preset administrative user, a server, and a smart device, wherein the user device is configured to send a binding request for the smart device to the server, the binding request being used for instructing the server to bind the smart device;

the server is configured to record an administrative permission for the administrative user to the smart device in the process of binding; and the smart device is configured to, when a near-field communication signal from any user is received, identify the identity of the user; and when the user is determined as the administrative user, establish a near-field communication connection with an electronic device of the user to allow the user to configure the smart device.

Clause 2. The system of clause 1, wherein the server recording an administrative permission for the administrative user to the smart device comprises: the server acquiring a random code generated and uploaded by the smart device, generating a standard digital digest related to the random code according to a preset algorithm, and associatively recording the standard digital digest with the smart device, so that when a configuration request sent by the user device for the smart device is received, the server returns the standard digital digest to the administrative user to allow the administrative user to configure the smart device, wherein the random code is further recorded as a local random code on the smart device; and the smart device identifying the identity of the user comprises: the smart device acquiring a to-be-verified digital digest included in the near-field communication signal, and generating a local digital digest related to the recorded local random code according to the preset algorithm, wherein when the to-be-verified digital digest matches the local digital digest, the smart device determines the user as the administrative user.

Clause 3. A device configuration method comprising:

sending, by a user device, a near-field communication signal comprising identity information of a logged-in user to a smart device to instruct the smart device to identify an identity of the logged-in user; and determining, by the user device, according to a response of the smart device to the near-field communication signal, that the smart device determines the logged-in user as an administrative user corresponding to the smart device, and establishing a near-field communication connection with the smart device to configure the smart device.

Clause 4. The method of clause 3, further comprising:

sending, by the user device, a configuration request for the smart device to a server, the configuration request being used for instructing the server to return a standard digital digest corresponding to the smart device;

receiving, by the user device, the standard digital digest returned by the server as the identity information of the logged-in user, wherein the standard digital digest is related to a random code previously generated and uploaded by the smart device, and the random code is further recorded as a local random code on the smart device; and adding, by the user device, the standard digital digest to the near-field communication signal as the identity information to instruct the smart device to generate a local digital digest related to the recorded local random code, and when the standard digital digest matches the local digital digest, establish a near-field communication connection with a sender device of the near-field communication signal in response to the near-field communication signal to allow the sender device to configure the smart device.

Clause 5. The method of clause 4, wherein:

the smart device is bound to a preset team;

the configuration request comprises identity information of a local user for instructing the server to return the standard digital digest corresponding to the smart device when the identity information matches an administrative user of the preset team.

Clause 6. A device configuration method comprising:

acquiring, by a server, identity authentication information of an administrative user corresponding to a preset smart device when a configuration request sent by a preset user for the smart device is received; and returning, by the server, the identity authentication information to the preset user such that the preset user sends a near-field communication signal comprising the identity authentication information to the smart device, wherein the near-field communication signal is used for instructing the smart device to determine according to the identity authentication information that the preset user has an administrative permission, and establish a near-field communication connection with a sender device of the near-field communication signal to allow the sender device to configure the smart device.

Clause 7. The method of clause 6, wherein:

the preset user is an administrative user of a preset team; and the smart device is previously bound to the preset team.

Clause 8. The method of clause 6, wherein the identity authentication information comprises a standard digital digest corresponding to the smart device, the standard digital digest is related to a random code previously generated and uploaded by the smart device, and the random code is further recorded as a local random code on the smart device; and the near-field communication signal is used for instructing the smart device to generate a local digital digest related to the recorded local random code, and when the standard digital digest matches the local digital digest, the preset user is determined as having an administrative permission.

Clause 9. The method of clause 8, wherein the standard digital digest is a digital digest of the random code; or the standard digital digest is a common digital digest of the random code and at least one of the following information: an activation code of the smart device, a serial number of the smart device, and identification information of a bound object of the smart device.

Clause 10. The method of clause 8, further comprising:

updating, by the server, the recorded standard digital digest according to an updated random code generated and uploaded by the smart device, wherein the updated random code is further used by the smart device to update the local random code.

Clause 11. A device configuration method comprising:

acquiring, by a smart device, identity information included in a near-field communication signal sent by a user when the near-field communication signal is received;

identifying, by the smart device, the identity of the user according to the identity information; and when the user is determined as an administrative user corresponding to the smart device, establishing, by the smart device, a near-field communication connection with an electronic device used by the user to allow the electronic device to configure the smart device.

Clause 12. The method of clause 11, wherein:

the method further comprises: uploading, by the smart device, a generated random code to a server so that the server generates a standard digital digest related to the random code and sends the standard digital digest to a preset administrative user having an administrative permission to the smart device as identity information of the preset administrative user, wherein the random code is further recorded as a local random code of the smart device; and the identifying, by the smart device, the identity of the user according to the identity information comprises:

generating, by the smart device, a local digital digest related to the recorded local random code;

comparing the local digital digest with a to-be-verified digital digest that is the identity information in the near-field communication signal; and when the to-be-verified digital digest matches the local digital digest, determining the user as the administrative user corresponding to the smart device.

Clause 13. The method of clause 12, further comprising:

generating, by the smart device, an updated random code and uploading the random code to the server so that the server updates the standard digital digest, wherein the updated random code is further used for updating the local random code.

Clause 14. The method of clause 13, wherein the generating the updated random code and uploading the random code to the server comprises:

generating, by the smart device, the updated random code according to a predefined cycle and uploading the updated random code to the server; or generating, by the smart device, the updated random code and uploading the updated random code to the server after completion of a configuration operation.

Clause 15. A device configuration apparatus comprising:

a sending unit configured to make user device send a near-field communication signal comprising identity information of a logged-in user to a smart device to instruct the smart device to identify an identity of the logged-in user; and an identifying unit configured to make the user device determine, according to a response of the smart device to the near-field communication signal, that the smart device determines the logged-in user as an administrative user corresponding to the smart device, and establish a near-field communication connection with the smart device to configure the smart device.

Clause 16. The apparatus of clause 15, further comprising:

a request unit configured to make the user device send a configuration request for the smart device to a server, the configuration request being used for instructing the server to return a standard digital digest corresponding to the smart device;

a receiving unit configured to make the user device receive the standard digital digest returned by the server as the identity information of the logged-in user, wherein the standard digital digest is related to a random code previously generated and uploaded by the smart device, and the random code is further recorded as a local random code on the smart device; and an adding unit configured to make the user device add the standard digital digest to the near-field communication signal as the identity information to instruct the smart device to generate a local digital digest related to the recorded local random code, and when the standard digital digest matches the local digital digest, establish a near-field communication connection with a sender device of the near-field communication signal in response to the near-field communication signal to allow the sender device to configure the smart device.

Clause 17. A device configuration apparatus comprising:

an acquisition unit configured to make a server acquire identity authentication information of an administrative user corresponding to a preset smart device when a configuration request sent by a preset user for the smart device is received; and a returning unit configured to make the server return the identity authentication information to the preset user such that the preset user sends a near-field communication signal comprising the identity authentication information to the smart device, wherein the near-field communication signal is used for instructing the smart device to determine according to the identity authentication information that the preset user has an administrative permission, and establish a near-field communication connection with a sender device of the near-field communication signal to allow the sender device to configure the smart device.

Clause 18. The apparatus of clause 17, wherein the identity authentication information comprises a standard digital digest corresponding to the smart device, the standard digital digest is related to a random code previously generated and uploaded by the smart device, and the random code is further recorded as a local random code on the smart device; and the near-field communication signal is used for instructing the smart device to generate a local digital digest related to the recorded local random code, and when the standard digital digest matches the local digital digest, the preset user is determined as having an administrative permission.

Clause 19. The apparatus of clause 18, further comprising:

an updating unit configured to make the server update the recorded standard digital digest according to an updated random code generated and uploaded by the smart device, wherein the updated random code is further used by the smart device to update the local random code.

Clause 20. A device configuration apparatus comprising:

an acquisition unit configured to make a smart device acquire identity information comprised in a near-field communication signal sent by a user when the near-field communication signal is received;

an identifying unit configured to make the smart device identify the identity of the user according to the identity information; and an establishing unit configured to, when the user is determined as an administrative user corresponding to the smart device, make the smart device establish a near-field communication connection with an electronic device used by the user to allow the electronic device to configure the smart device.

Clause 21. The apparatus of clause 20, wherein the apparatus further comprises: an uploading unit configured to make the smart device upload a generated random code to a server so that the server generates a standard digital digest related to the random code and sends the standard digital digest to a preset administrative user having an administrative permission to the smart device as identity information of the preset administrative user, wherein the random code is further recorded as a local random code of the smart device; and the identifying unit is configured to make the smart device generate a local digital digest related to the recorded local random code, and compare the local digital digest with a to-be-verified digital digest that is the identity information in the near-field communication signal, wherein when the to-be-verified digital digest matches the local digital digest, the smart device determines the user as the administrative user corresponding to the smart device.

Clause 22. The apparatus of clause 21, further comprising:

an updating unit configured to make the smart device generate an updated random code and upload it to the server so that the server updates the standard digital digest, wherein the updated random code is further used for updating the local random code.

What is claimed is:
1. A method comprising:
sending, by a user device, a near-field communication signal including identity information of a logged-in user to a device to instruct the device to identify an identity of the logged-in user, the user device configured to uniquely correspond to an administrative user in providing the identity information;
determining, by the user device, according to a response of the device to the near-field communication signal, that the device determines the logged-in user as the administrative user corresponding to the device;
establishing, by the user device, a near-field communication connection with the device to configure the device; and sending, by the user device, a configuration request for the device to a server, the configuration request instructing the server to return a digital digest corresponding to the device, the digital digest including an activation code of the device, wherein the activation code is one of:
proactively aged according to a preset cycle and a new activation code is requested from the server, or
updated in response to an occurrence of a particular event and the updated activation code is uploaded to the server.

2. The method of claim 1, wherein the digital digest further includes at least one of:
a serial number of the device, or identification information of a bound object of the device.

3. The method of claim 1, further comprising:
receiving, by the user device, the digital digest returned by the server as the identity information of the logged-in user.

4. The method of claim 3, wherein:
the digital digest is related to a random code previously generated and uploaded by the device; and
the random code is further recorded as a local random code on the device.

5. The method of claim 4, further comprising:
adding, by the user device, the digital digest to the near-field communication signal as the identity information to instruct the device to generate a local digital digest related to the recorded local random code.

6. The method of claim 5, wherein the establishing, by the user device, the near-field communication connection with the device to configure the device includes:
determining that the digital digest matches the local digital digest; and
establishing the near-field communication connection with the device.

7. The method of claim 1, wherein:
the device is bound to a preset team, each member of the preset team being the administrative user; and
the configuration request includes the identity information and an instruction to instruct the server to return the digital digest corresponding to the device in response to determining that the identity information matches the administrative user of the preset team.

8. A server comprising:
one or more processors; and
one or more memories stored thereon computer readable instructions that, when executed by the one or more processors, cause the one or more processors to perform acts comprising:
acquiring identity authentication information of an administrative user corresponding to a device in response to receiving a configuration request for the device sent by a preset user via a user device, the identity authentication information provided by the user device uniquely corresponding to a user with an administrative permission, the identity authentication information including a digital digest corresponding to the device, the digital digest including an activation code of the device, wherein the activation code is one of:
proactively aged according to a preset cycle and a new activation code is requested from the server, or
updated in response to an occurrence of a particular event and the updated activation code is uploaded to the server; and
returning the identity authentication information to the user device for sending a near-field communication signal including the identity authentication information to the device.

9. The server of claim 8, wherein:
the near-field communication signal instructs the device to determine according to the identity authentication information that the preset user has the administrative permission, and to establish a near-field communication connection with the user device to allow the user device to configure the device.

10. The server of claim 8, wherein:
the preset user is an administrative user of a preset team; and
the device is bound to the preset team.

11. The server of claim 8, wherein:
the digital digest is related to a random code previously generated and uploaded by the device, and the random code is further recorded as a local random code on the device;
the near-field communication signal instructs the device to generate a local digital digest related to the recorded local random code; and
the preset user is determined as having the administrative permission in response to determining that the digital digest matches the local digital digest.

12. The sever of claim 11, wherein the digital digest is a digital digest of the random code.

13. The server of claim 8, wherein the digital digest is further a digital digest of the random code and at least one of:
a serial number of the device, or
identification information of a bound object of the device.

14. The server of claim 11, wherein the acts further comprise:
updating a recorded digital digest according to an updated random code generated and uploaded by the device, wherein the updated random code is further used by the device to update the local random code.

15. One or more memories stored thereon computer readable instructions that, when executed by one or more processors, cause the one or more processors to perform acts comprising:
acquiring, by a device, identity information of a user of a user device included in a near-field communication signal sent by the user device in response to receiving the near-field communication signal, the user device configured to uniquely correspond to an administrative user in providing the identity information;
identifying, by the device, the identity of the user according to the identity information;
determining, by the device, that the user is the administrative user corresponding to the device;
establishing, by the device, a near-field communication connection with the user device to allow the user device to configure the device;
uploading, by the device, a generated random code to a server; and
causing, by the device, the server to send a standard digital digest to a preset administrative user having an administrative permission to the device as identity information of the preset administrative user, the standard digital digest including an activation code of the device, wherein the activation code is one of:
proactively aged, by the device, according to a preset cycle and a new activation code is requested, by the device, from the server, or updated, by the device, in response to an occurrence of a particular event and the updated activation code is uploaded, by the device, to the server.

16. The one or more memories of claim 15, wherein the acts further comprise:
causing, by the device, the server to generate the standard digital digest related to the generated random code, wherein the generated random code is further recorded as a local random code of the device.

17. The one or more memories of claim 16, wherein the identifying, by the device, the identity of the user according to the identity information comprises:
generating, by the device, a local digital digest related to the recorded local random code;
comparing the local digital digest with a to-be-verified digital digest that is the identity information in the near-field communication signal; and
in response to determining that the to-be-verified digital digest matches the local digital digest, determining the user as the administrative user corresponding to the device.

18. The one or more memories of claim 17, further comprising:
generating, by the device, an updated random code and uploading the random code to the server so that the server updates the digital digest, wherein the updated random code is further used for updating the local random code.

19. The one or more memories of claim 18, wherein the generating, by the device, the updated random code and uploading the random code to the server includes:
generating, by the device, the updated random code according to a predefined cycle and uploading the updated random code to the server; or
generating, by the device, the updated random code and uploading the updated random code to the server after completion of a configuration operation.

20. The one or more memories of claim 15, wherein the digest further includes at least one of:
a serial number of the device, or
identification information of a bound object of the device.

* * * * *